(12) United States Patent
Yamamura

(10) Patent No.: US 10,175,604 B2
(45) Date of Patent: Jan. 8, 2019

(54) LENS UNIT, LIGHT-EXPOSURE APPARATUS, AND IMAGE FORMING APPARATUS

(71) Applicant: Oki Data Corporation, Tokyo (JP)

(72) Inventor: Akihiro Yamamura, Tokyo (JP)

(73) Assignee: Oki Data Corporation, Tokyo (JP)

( * ) Notice: Subject to any disclaimer, the term of this patent is extended or adjusted under 35 U.S.C. 154(b) by 6 days.

(21) Appl. No.: 15/435,375

(22) Filed: Feb. 17, 2017

(65) Prior Publication Data
US 2017/0261881 A1 Sep. 14, 2017

(30) Foreign Application Priority Data

Mar. 8, 2016 (JP) .................................. 2016-043996

(51) Int. Cl.
| | | |
|---|---|---|
| *G02B 27/10* | (2006.01) | |
| *G03G 15/04* | (2006.01) | |
| *G02B 3/00* | (2006.01) | |
| *G02B 7/02* | (2006.01) | |

(52) U.S. Cl.
CPC ....... *G03G 15/04036* (2013.01); *G02B 3/005* (2013.01); *G02B 3/0056* (2013.01); *G02B 7/028* (2013.01); *G03G 15/04054* (2013.01); *G03G 2215/0141* (2013.01)

(58) Field of Classification Search
CPC ...... G02B 3/0056; G02B 3/005; G02B 26/06; G02B 27/0068; G02B 3/0062; G02B 27/2214; G02B 3/0012; G02B 3/0031; G02B 3/0087; G02B 7/005; G02B 27/0927; G02B 7/028; G02B 7/346; G02B 26/10; G02B 27/027; G02B 6/12019; G02B 6/2931; G02B 6/29361
USPC ......................... 359/619–633, 290–292, 298
See application file for complete search history.

(56) References Cited

U.S. PATENT DOCUMENTS

| | | | | |
|---|---|---|---|---|
| 2011/0102920 A1* | 5/2011 | Shyu | ...................... | G02B 7/08 359/823 |
| 2013/0135694 A1* | 5/2013 | Yamamura | ............... | H04N 1/10 358/474 |

FOREIGN PATENT DOCUMENTS

JP          2013-15847 A          1/2013

* cited by examiner

*Primary Examiner* — Brandi Thomas
(74) *Attorney, Agent, or Firm* — Rabin & Berdo, P.C.

(57) ABSTRACT

A lens unit includes a first lens array including a plurality of first lens elements. The first lens array satisfies $D_1 \leq 0.25 \cdot P_1$ where $P_1$ is a pitch in a first direction between optical axes of adjacent ones of the first lens elements, and $D_1$ is a displacement amount that is an absolute value of a difference between a first length $W_{E1}$ from a center position of the first lens array to an end position of the first lens array in the first direction at a first temperature, and a second length $W_{E2}$ from the center position of the first lens array to the end position of the first lens array at a second temperature higher than the first temperature by 30° C.

10 Claims, 22 Drawing Sheets

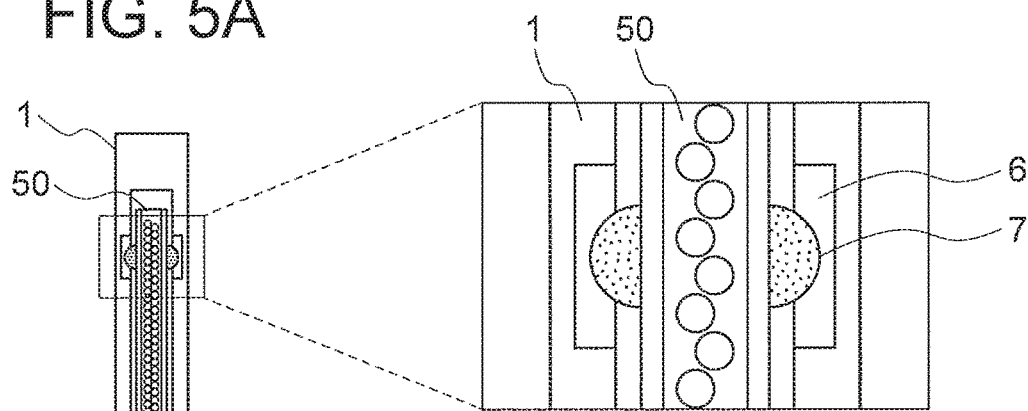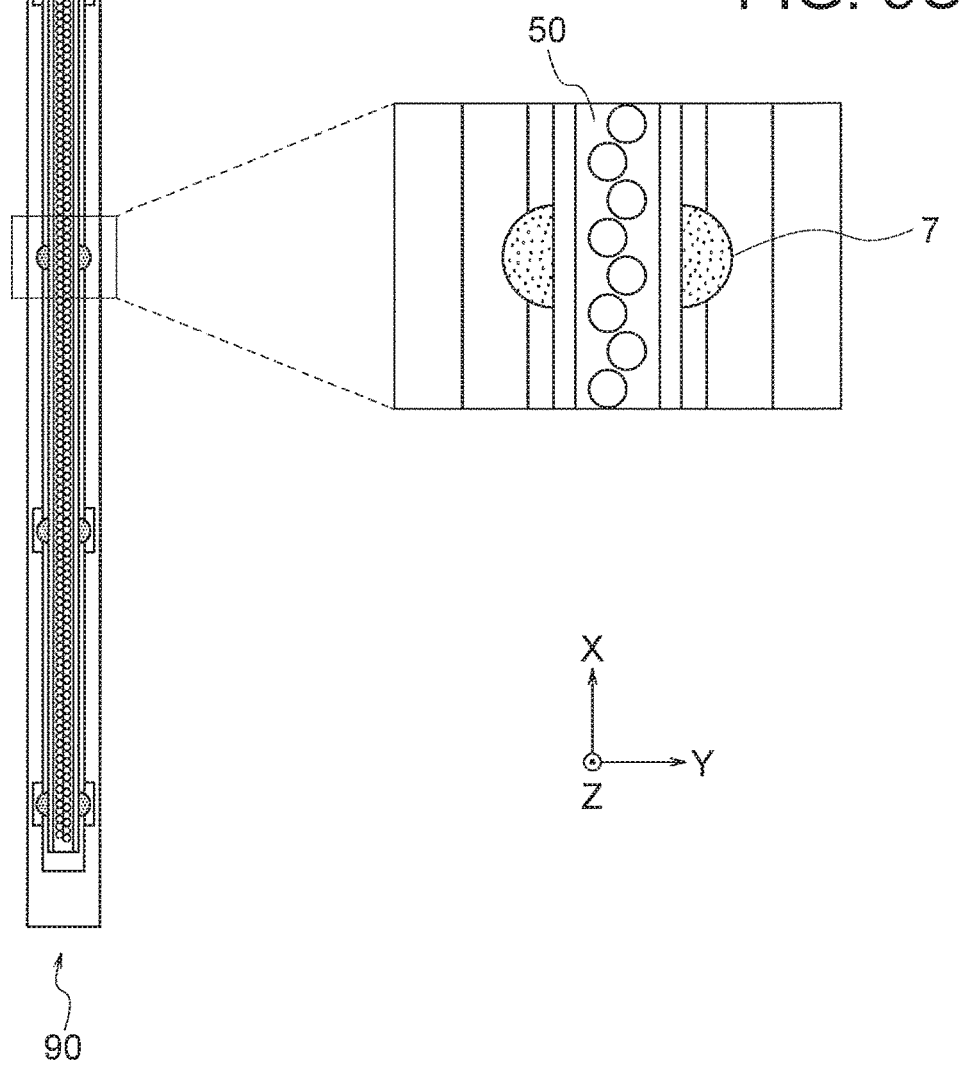

FIG. 8
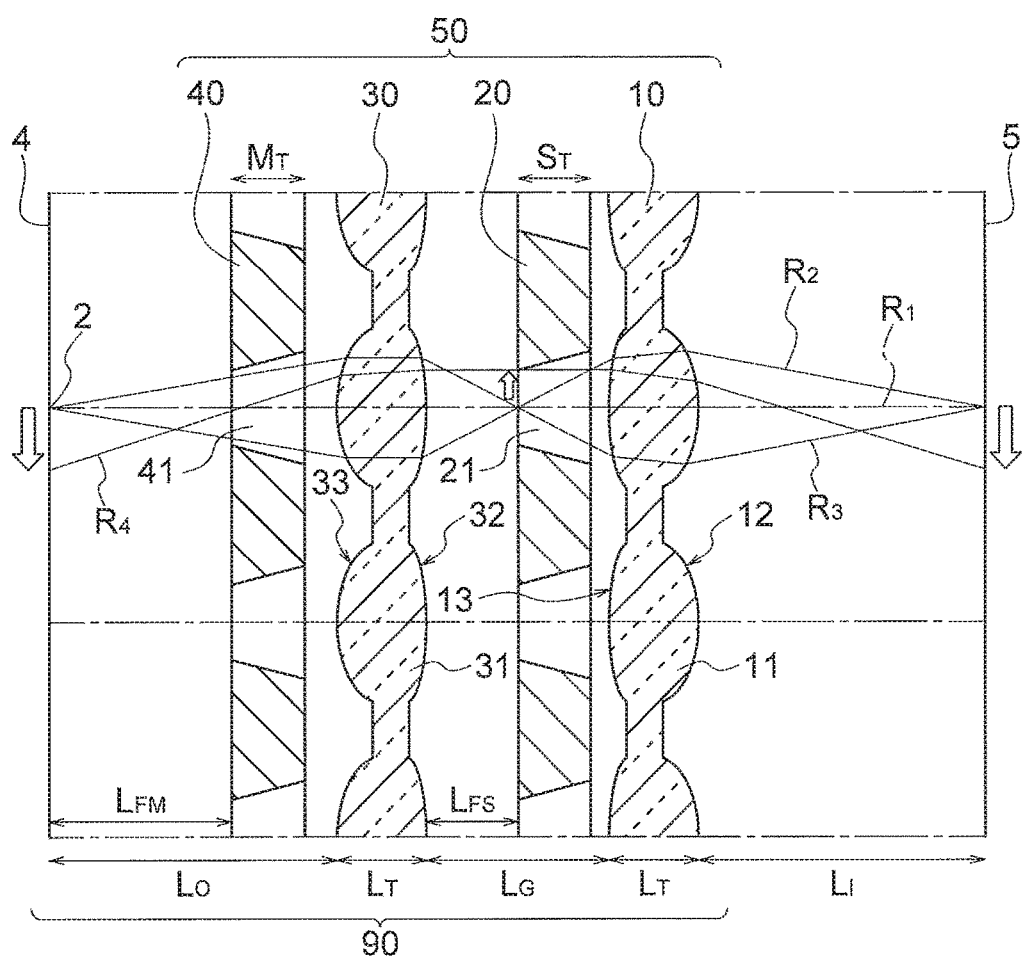
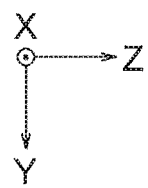

LENS UNIT, LIGHT-EXPOSURE APPARATUS, AND IMAGE FORMING APPARATUS

BACKGROUND OF THE INVENTION

1. Field of the Invention

The present invention relates to a lens unit including a lens array, a light-exposure apparatus including the lens unit, and an image forming apparatus including the light-exposure apparatus.

2. Description of the Related Art

A light-emitting diode (LED) print head is employed as a light-exposure apparatus (optical print head) of an image forming apparatus of an electrophotographic system (see, for example, Patent Document 1). The LED print head includes an LED array including a plurality of LEDs arranged on a board, a lens array including a plurality of lens elements (microlenses) for converging light emitted from the plurality of LEDs, and a lens holder for holding the board provided with the LED array and a lens unit including the lens array.

Patent Document 1 is Japanese Patent Application Publication No. 2013-15847.

The coefficient of linear expansion in a longitudinal direction of the lens array, however, is different from the coefficient of linear expansion in a longitudinal direction of the board provided with the plurality of LEDs, and thus, a temperature change causes a relative displacement between the plurality of LEDs (LED array) and the plurality of lens elements (lens array). This displacement changes an imaging state (the shape and amount of light forming an image on a photosensitive drum) of the LED array formed by the lens array, thereby causing banding (periodic vertical stripes) corresponding to a pitch of arrangement of the plurality of lens elements in a printed image.

SUMMARY OF THE INVENTION

It is therefore an object of the present invention to provide a lens unit, a light-exposure apparatus, and an image forming apparatus with which no banding occurs in a printed image of the image forming apparatus even when a lens array expands or contracts because of a temperature change.

A lens unit according to an aspect of the present invention includes a first lens array including a plurality of first lens elements arranged in a first direction, wherein the first lens array satisfies $D_1 \leq 0.25 \cdot P_1$ where $P_1$ is a pitch in the first direction between optical axes of adjacent first lens elements of the plurality of first lens elements, and $D_1$ is a displacement amount that is an absolute value of a difference between a first length which is a length in the first direction from a center position of the first lens array to an end position of the first lens array at a first temperature and a second length which is a length in the first direction from the center position of the first lens array to the end position of the first lens array at a second temperature higher than the first temperature by 30° C.

A light-exposure apparatus according to another aspect of the present invention includes: a light-emitting device array including a plurality of light-emitting devices; and the lens unit that converges light emitted from the light-emitting device array.

An image forming apparatus according to yet another aspect of the present invention includes the light-exposure apparatus; and an image carrier which is exposed to light by the light-exposure apparatus so that an electrostatic latent image is formed on the image carrier.

The present invention can provide an advantage that no banding occurs in a printed image of an image forming apparatus even when a lens array expands or contracts because of a temperature change.

BRIEF DESCRIPTION OF THE DRAWINGS

In the attached drawings:

FIGS. 5A through 5C are plan views illustrating a state in which a lens unit according to the first embodiment is fixed to a holder;

FIG. 8 is a cross-sectional view schematically illustrating a configuration of the lens unit according to the first embodiment;

DETAILED DESCRIPTION OF THE INVENTION

Figure 1:
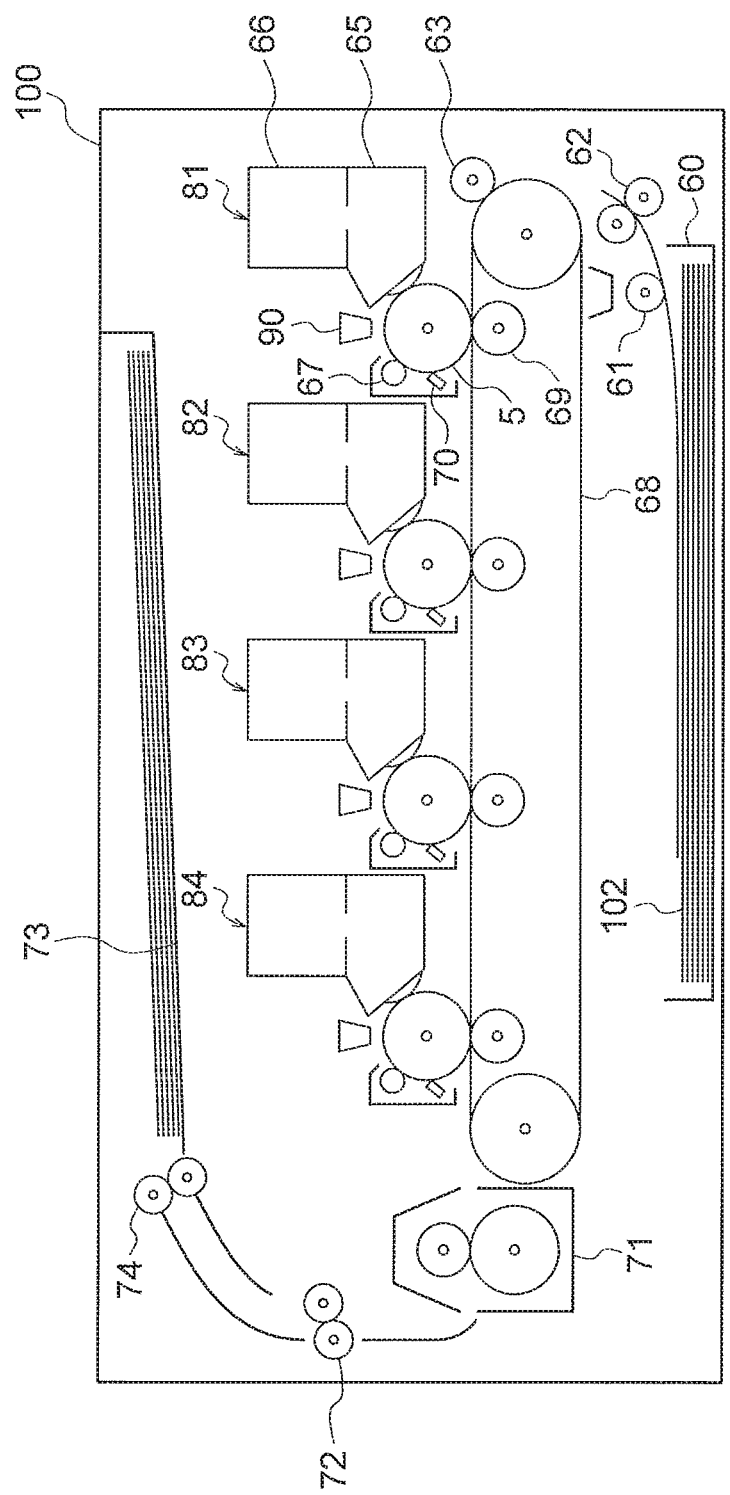
FIG. 1 is a view schematically illustrating a configuration of a printer according to a first embodiment of the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications will become apparent to those skilled in the art from the detailed description.

1. First Embodiment

1-1. Configuration

A lens unit, a light-exposure apparatus, and an image forming apparatus according to a first embodiment of the present invention will be described hereinafter with reference to the drawings. The drawings show an XYZ orthogonal coordinate system for easy understanding of a relationship among the drawings. In the drawings, an X axis is represented as a coordinate axis parallel to a longitudinal direction (main scanning direction) of the light-exposure apparatus. In the drawings, a Y axis is represented as a coordinate axis parallel to a lateral direction (sub-scanning direction) of the light-exposure apparatus. In the drawings, a Z axis is represented as a coordinate axis parallel to a height direction of the light-exposure apparatus.

A configuration of a printer 100 as an image forming apparatus according to the first embodiment will be described with reference to FIG. 1. FIG. 1 is a view schematically illustrating the printer 100 according to the first embodiment of the present invention. The printer 100 is an image forming apparatus for forming an image based on image data on a print medium by using toner as a developer of a resin containing a pigment as a coloring material.

As illustrated in FIG. 1, the printer 100 is equipped with a paper cassette 60 that accommodates a paper sheet 102 as a print medium. The printer 100 includes a paper feed roller 61 for taking the paper sheet 102 from the paper cassette 60 and conveying rollers 62 and 63 for conveying the paper sheet 102.

The printer 100 according to the first embodiment is a printer of a color electrophotographic system. In the printer 100, image forming units 81, 82, 83, and 84 corresponding to yellow, magenta, cyan, and black respectively are sequentially arranged along a conveying path of the paper sheet 102. Each of the image forming units 81, 82, 83, and 84 includes a photosensitive drum 5 serving as an electrostatic latent image carrier for forming an image, a developing unit 65 serving as a developing part for developing the electrostatic latent image formed on the photosensitive drum 5 with the toner to form a toner image, and a toner cartridge 66 for supplying toner to the developing unit 65.

Each of the image forming units 81, 82, 83, and 84 includes a charging roller 67 for supplying electric charge to a surface of the photosensitive drum 5 to cause the surface to be uniformly charged, and an LED head 90 serving as a light-exposure apparatus that applies light based on image data onto the uniformly charged surface of the photosensitive drum 5 to form an electrostatic latent image.

The printer 100 further includes a transfer belt 68 for conveying the paper sheet 102, and a transfer roller 69 serving as a transfer unit for transferring a toner image formed on the photosensitive drum 5 onto the paper sheet 102 by visualizing (making visible) an electrostatic latent image with toner. The transfer roller 69 is arranged to face the photosensitive drum 5 so that the transfer belt 68 is sandwiched between the transfer roller 69 and the photosensitive drum 5 at a transfer position.

The printer 100 also includes a cleaning blade 70 that touches the photosensitive drum 5 and is used for removing (scraping) toner remaining on the surface of the photosensitive drum 5 after transfer of a toner image onto the paper sheet 102. The printer 100 also includes a fixing unit 71 for fixing the toner image formed on the paper sheet 102 with heat and pressure. The printer 100 also includes a conveying roller 72 for conveying the paper sheet 102 that has passed through the fixing unit 71, an ejection unit 73 on which the paper sheet 102 on which an image is formed is loaded, and an ejection roller 74 for ejecting the paper sheet 102 to the ejection unit 73.

A predetermined voltage is applied to the charging roller 67 and the transfer roller 69 from a power supply serving as an unillustrated voltage supply unit. The transfer belt 68, the photosensitive drum 5, and the rollers receive a driving force from an unillustrated driving force generator such as a motor and a driving force transmission mechanism such as a gear for transmitting a driving force generated by the driving force generator, and rotate.

The printer 100 further includes the developing unit 65, the LED head 90, the fixing unit 71, the driving force generator such as a motor for driving these units, an electric power supply unit (power supply unit) for supplying electric power to these units, and a control device serving as a controller for controlling operations of the entire printer 100. The printer 100 also includes an external interface for receiving print data from an external device or transmitting information to the external device.

Figure 2:
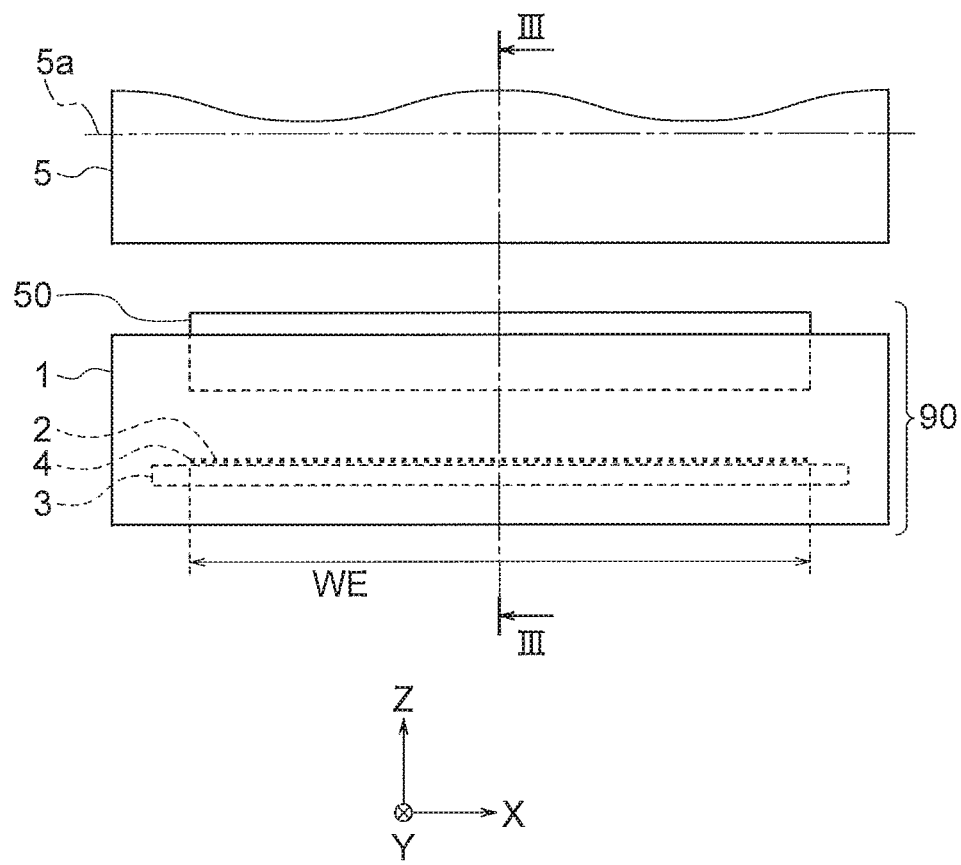
FIG. 2 is a side view schematically illustrating a configuration of an LED head according to the first embodiment.

A configuration of the LED head 90 as the light-exposure apparatus according to the first embodiment will now be described. FIG. 2 is a side view schematically illustrating a configuration of the LED head 90 according to the first embodiment. As illustrated in FIG. 2, the LED head 90 includes an LED array 4 serving as a light-emitting device array including a plurality of light-emitting devices and a lens unit 50 that converges light emitted from the LED array 4.

The LED head 90 may include a holder 1 for holding the lens unit 50, and a circuit board 3. The LED array 4 is constituted by a plurality of LED devices 2 that are arranged substantially linearly. The plurality of LED devices 2 in the LED array 4 are arranged in an X direction (lateral direction in FIG. 2) as a first direction. The LED devices 2 are, for example, light-emitting devices using light-emitting diodes (LEDs).

As illustrated in FIG. 2, the LED array 4 is disposed on the circuit board 3. A dimension of the LED array 4 in the X direction is $W_E$. The lens unit 50 has a long shape, and the lens unit 50 is disposed so that a longitudinal direction of the lens unit 50 is in parallel with the direction (X direction) in which the LED devices 2 of the LED array 4 are arranged.

The photosensitive drum 5 for forming an electrostatic latent image is disposed above the lens unit 50 (in the +Z direction) in FIG. 2. A chain double-dashed line 5a represents an axis line (rotation axis) around which the photosensitive drum 5 rotates. The photosensitive drum 5 is disposed to face the lens unit 50 so that the rotation axis 5a of the photosensitive drum 5 is in parallel with a longitudinal direction of the LED array 4.

Figure 3:
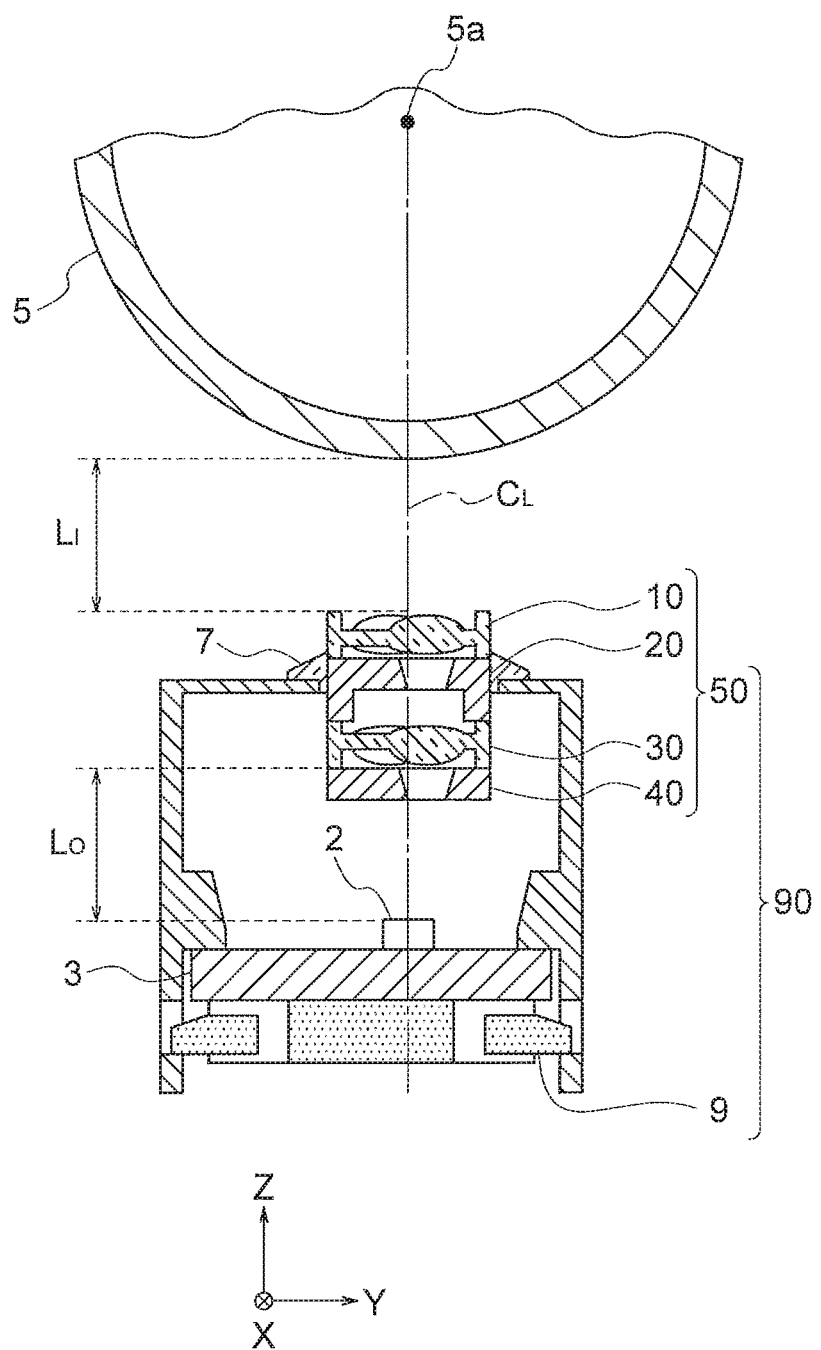
FIG. 3 is a cross-sectional view schematically illustrating a configuration (cross-sectional structure taken along line III-III in FIG. 2) of the LED head according to the first embodiment.

FIG. 3 is a cross-sectional view schematically illustrating a configuration (cross-sectional structure taken along line III-III in FIG. 2) of the LED head 90 according to the first embodiment. The LED device 2 is arranged in the X direction in FIG. 3, and an optical axis direction of light emitted from the LED device 2 is the Z direction in FIG. 3 (vertical direction in FIG. 3). A center line (line in the Z direction) passing through a center position of the lens unit 50 in the Y direction is $C_L$. The LED device 2 and the rotation axis 5a of the photosensitive drum 5 are disposed on the center line $C_L$ of the lens unit 50.

As illustrated in FIG. 3, the LED devices 2 are arranged on the circuit board 3. The circuit board 3 is supported by a base 9. A surface distance from the LED devices 2 to a lens surface (lens surface 33 described later) of the lens unit 50 is set at $L_O$. A surface distance from a lens surface (lens surface 12 described later) of the lens unit 50 to the photosensitive drum 5 is set at $L_I$. Here, $L_I=L_O$.

Figure 4:
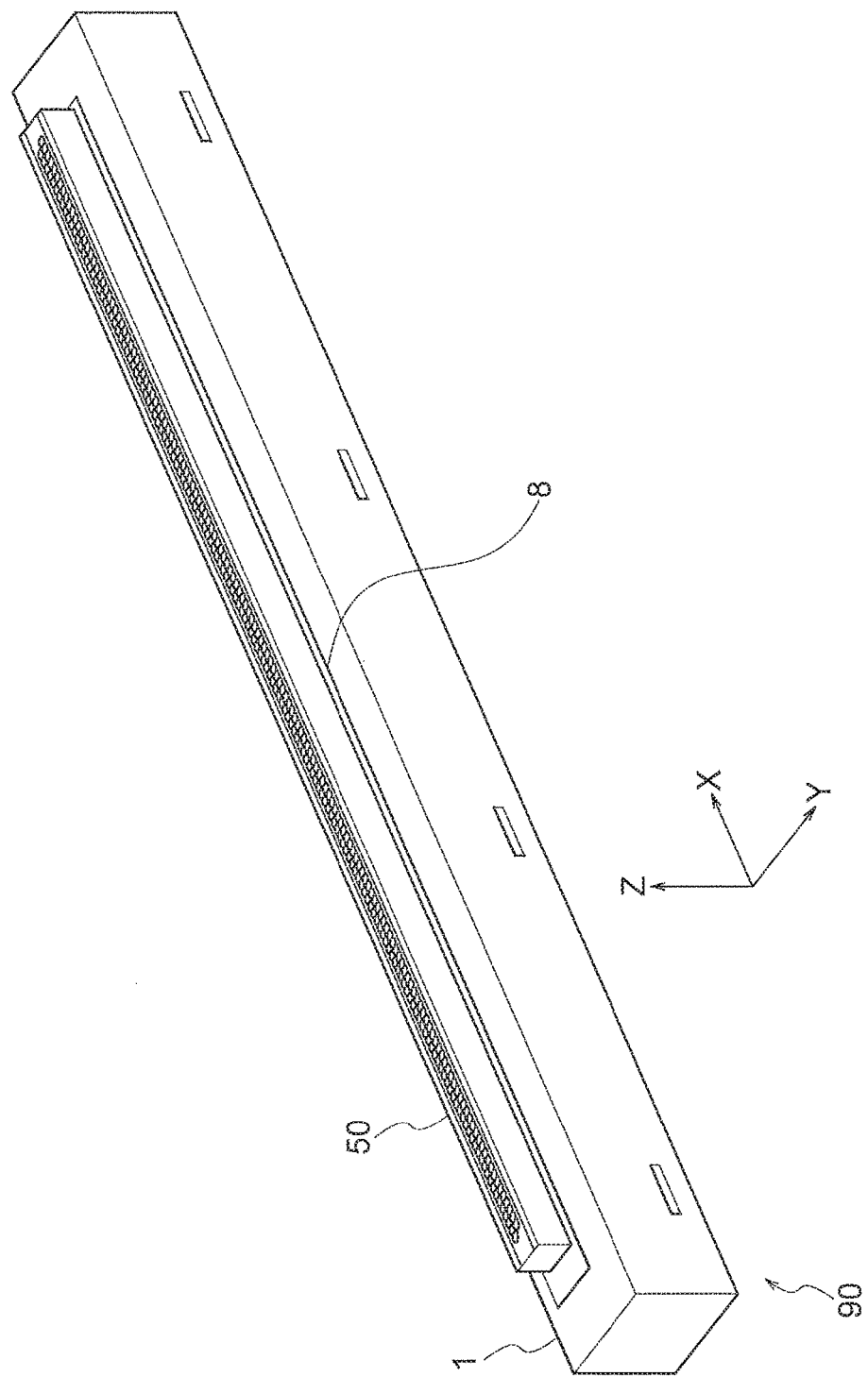
FIG. 4 is a perspective view schematically illustrating a configuration of the LED head according to the first embodiment.

FIG. 4 is a perspective view schematically illustrating a configuration of the LED head 90 according to the first embodiment. As illustrated in FIG. 4, the lens unit 50 is disposed above (in the +Z direction side of) the LED head 90. The lens unit 50 is supported and fixed by the holder 1 in such a manner that the directions of incident and emission of light beams on/to the lens unit 50 are the Z direction (vertical direction in FIG. 4). A sealing member 8 is disposed between the holder 1 and the lens unit 50 to fill a gap between the holder 1 and the lens unit 50.

In the first embodiment, the LED head 90 has a resolution of 1200 [dpi]. That is, 1200 LED devices 2 are arranged per inch in the LED array 4. In other words, the LED devices 2 are arranged at a pitch of 0.021167 [mm]. A center value of emission wavelengths of the LED devices 2 is 770 [nm].

Referring now to FIGS. 5A through 5C, a method for fixing the lens unit 50 to the holder 1 will be described. FIG. 5A is a plan view illustrating a state in which the lens unit 50 according to the first embodiment is fixed to the holder 1. FIG. 5B is an enlarged plan view illustrating the lens unit 50 and the holder 1 in an end portion in the X direction in FIG. 5A. FIG. 5C is an enlarged plan view illustrating the lens unit 50 and the holder 1 in a center portion in the X direction in FIG. 5A.

As illustrated in FIGS. 5A and 5C, the lens unit 50 is fixed to the holder 1 with an adhesive 7 in the center portion of the lens unit 50. Specifically, an end of the adhesive 7 is bonded to the center portion of the lens unit 50, and the other end of the adhesive 7 is bonded to the holder 1. As illustrated in FIGS. 5A and 5B, although one end of the adhesive 7 is bonded to an end of the lens unit 50, the other end of the adhesive 7 slidably contacts a sliding part (sliding surface) 6 of the holder 1, that is, the other end of the adhesive 7 is in contact with the sliding part 6 to be movable along the sliding part 6. The sliding part 6 is formed by, for example, applying a lubricant onto the holder 1. On the other hand, as illustrated in FIG. 5C, no sliding part 6 is formed between the lens unit 50 and the holder 1 in the center portion of the lens unit 50. In FIGS. 5A through 5C, the sealing member 8 is not shown.

As described above, the sliding part 6 is formed in end portions (both end portions) of the lens unit 50 and is not formed in the center portion of the lens unit 50. Thus, the center portion of the lens unit 50 is firmly fixed to the holder 1 and does not move relative to the holder 1. However, the sliding part 6 of the holder 1 makes the end portions of the lens unit 50 movable in the X direction (vertical direction in FIG. 5) that is the longitudinal direction of the lens unit 50. At the end portions of the lens unit 50, the lens array on the lens unit 50 can be displaced (extend and contract) in the X direction (+X direction for the upper end and −X direction for the lower end in FIG. 5) in accordance with a temperature change. The configuration in which the sliding part 6 is slidable can suppress occurrence of warpage of the lens unit 50 and the holder 1 due to a difference in expansion and contraction amount between the lens unit 50 and the holder 1 caused by the temperature change.

Figure 6:
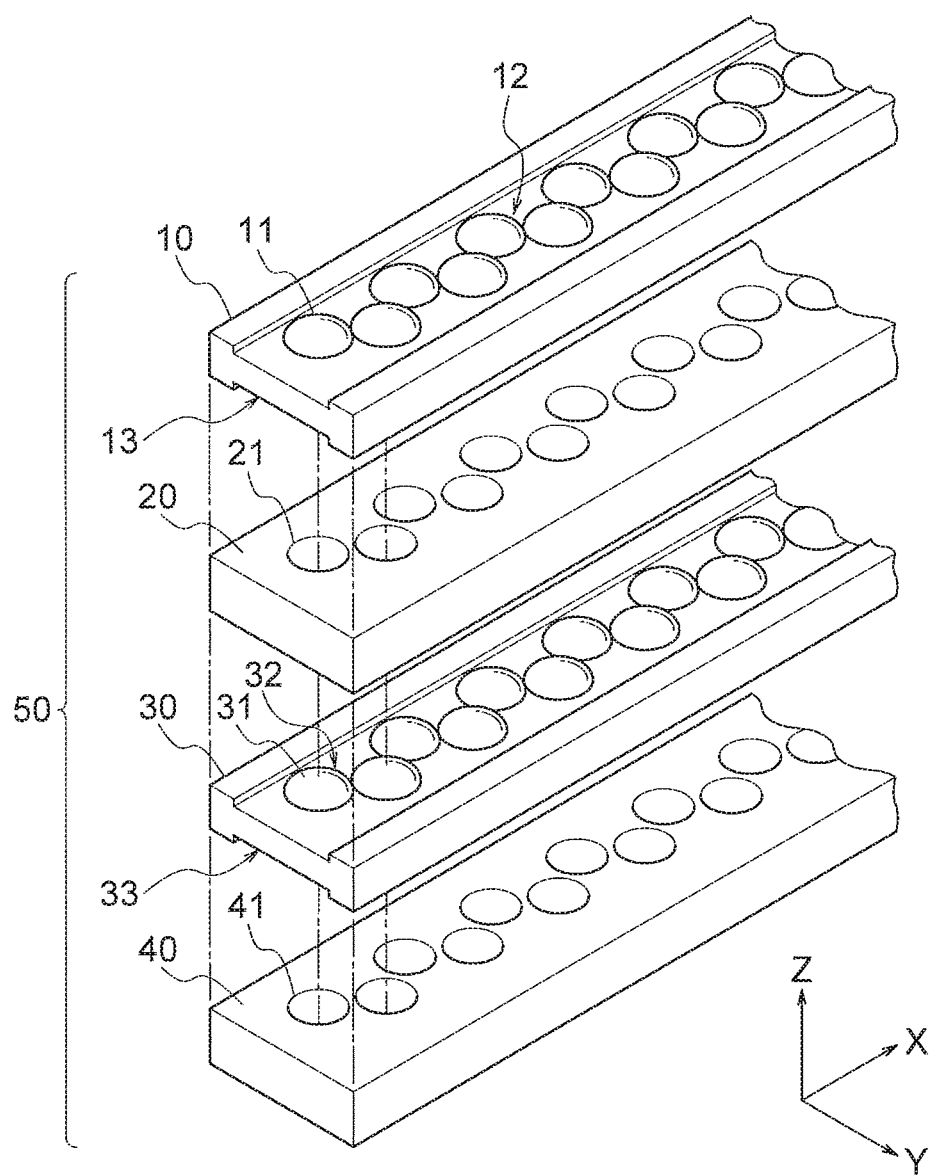
FIG. 6 is a disassembled perspective view in which the lens unit according to the first embodiment is disassembled in a Z direction.

A configuration of the lens unit 50 according to the first embodiment will now be described. FIG. 6 is a disassembled perspective view in which the lens unit 50 according to the first embodiment is disassembled to be separated in the Z direction. The lens unit 50 illustrated in FIG. 6 is disposed in such a manner that an optical axis of lenses of the lens array coincides with the vertical direction (Z direction) in FIG. 6. In FIG. 6, the LED devices 2 are disposed below the lens unit 50 (in the −Z direction side), and an image of the LED devices 2 is formed above the lens unit 50 (in the +Z direction side).

As illustrated in FIG. 6, the lens unit 50 is constituted by a stack of a first lens array 10, a light shield plate 20 as a first light shield member, a second lens array 30, and a mask 40 as a second light shield member, which are arranged in this order from above. The first lens array 10 includes lenses 11 serving as first lens elements and arranged in a staggered pattern (an arrangement including two lines of lens groups disposed in different positions in the Y direction). The second lens array 30 includes lenses 31 serving as second lens elements and arranged in a staggered pattern. The lenses 31 are arranged to have their optical axes coincide with those of the corresponding lenses 11. The arrangements of the plurality of lenses 11 and the plurality of lenses 31 are not limited to the staggered pattern. For example, the plurality of lenses 11 may be linearly arranged, and the plurality of lenses 31 may be linearly arranged.

Each of the lenses 11 has a lens surface 12 that is an upper surface (in the +Z direction side) in FIG. 6 and a lens surface 13 that is a lower surface (in the −Z direction side) in FIG. 6. Each of the lenses 31 has a lens surface 32 that is an upper surface (in the +Z direction side) in FIG. 6 and a lens surface 33 that is a lower surface (in the −Z direction side) in FIG. 6.

Each of the first lens array 10 and the second lens array 30 is made of a material transmissive to light beams. The first lens array 10 includes the integrally formed plurality of lenses 11. The second lens array 30 includes the integrally formed plurality of lenses 31.

The light shield plate 20 and the mask 40 are light shield members that shield stray light and flare light except light beams forming an image of the LED array 4. The light shield plate 20 has openings 21 arranged in a staggered pattern. The mask 40 has openings 41 arranged in a staggered pattern. The lenses 11, the openings 21, the lenses 31, and the openings 41 are arranged to correspond to one another. A set of the lens 11, opening 21, lens 31 and opening 41 constitute one equal-magnification erect image forming unit. In general, each of the lenses 11, a corresponding one of the openings 21, a corresponding one of the lenses 31, and a corresponding one of the openings 41 are arranged to have the same center in the X direction and the Y direction.

Figure 7:
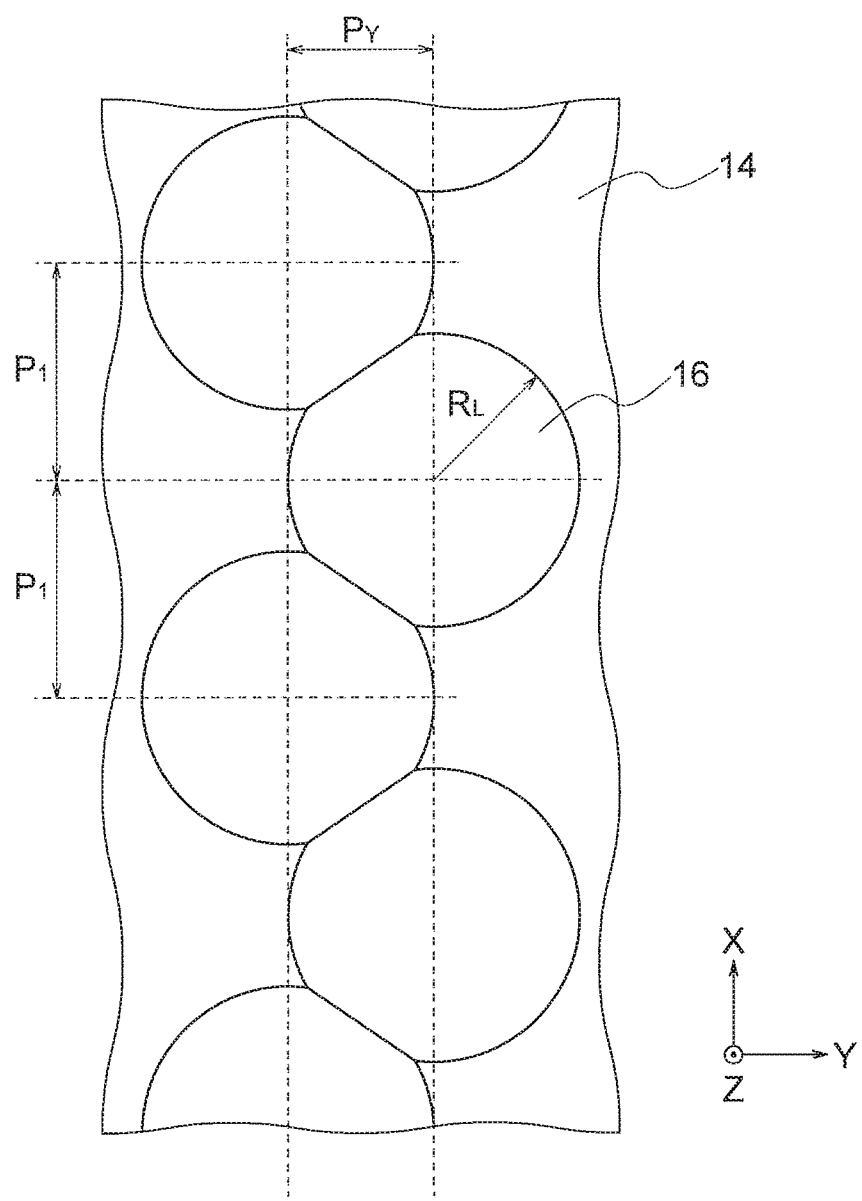
FIG. 7 is a top view schematically illustrating a configuration of a first lens array according to the first embodiment.

Referring to FIG. 7, a shape of the first lens array 10 will be described. FIG. 7 is a top view schematically illustrating a configuration of the first lens array 10 according to the first embodiment. The vertical direction (X direction) in FIG. 7 is a longitudinal direction of the first lens array 10. As illustrated in FIG. 7, in the first lens array 10, the lenses 11 are arranged in a staggered pattern (arrangement including two lines of lens groups disposed in different positions in the Y direction). A pitch in the X direction between adjacent ones of the lenses 11 is $P_1$, and a pitch in each line of the lenses 11 is $2 \times P_1$. A pitch in a transverse direction (Y direction) between adjacent ones of the lenses 11 in FIG. 7 is $P_Y$. A radius of the lens 11 is $R_L$. A portion of the first lens array 10 where the lenses 11 are not formed is, for example, a flat surface.

The second lens array 30 can be symmetric structure to the first lens array 10 in the vertical direction (Z direction). Thus, the second lens array 30 has a shape similar to that illustrated in FIG. 7. In the second lens array 30, the plurality of lenses 31 are arranged in a staggered pattern. A pitch between adjacent ones of the lenses 31 is $P_2$ ($P_2=P_1$), and a pitch in each line of the lenses 31 is $2 \times P_2$. A pitch in the Y direction (transverse direction in FIG. 7) between adjacent ones of the lenses 31 is $P_Y$. A radius of the lens 31 is $R_L$.

FIG. 8 is a cross-sectional view schematically illustrating a configuration of the lens unit 50 according to the first embodiment. The LED array 4 is disposed on the left (in the −Z direction side) in FIG. 8, and an image is formed on the right (in the +Z direction side) in FIG. 8.

As illustrated in FIG. 8, a length (distance) from the LED array 4 to the lens surface 33 is $L_O$. A length (thickness) between the lens surface 32 and the lens surface 33 is $L_T$. A length (distance) between the lens surface 32 and the lens surface 13 is $L_I$. A length (thickness) between the lens surface 12 and the lens surface 13 is $L_T$. A length (distance) between the lens surface 12 and a plane (imaging plane) on which an image of the LED array 4 is formed is $L_T$. A length (distance) between the LED array 4 and a lower surface (surface facing in the −Z direction) of the mask 40 is $L_{FM}$. A length (distance) between the lens surface 32 and a lower surface (surface facing in the −Z direction) of the light shield plate 20 is $L_{FS}$. A thickness of the mask 40 is $M_T$. A thickness of the light shield plate 20 is $S_T$.

Figure 9:
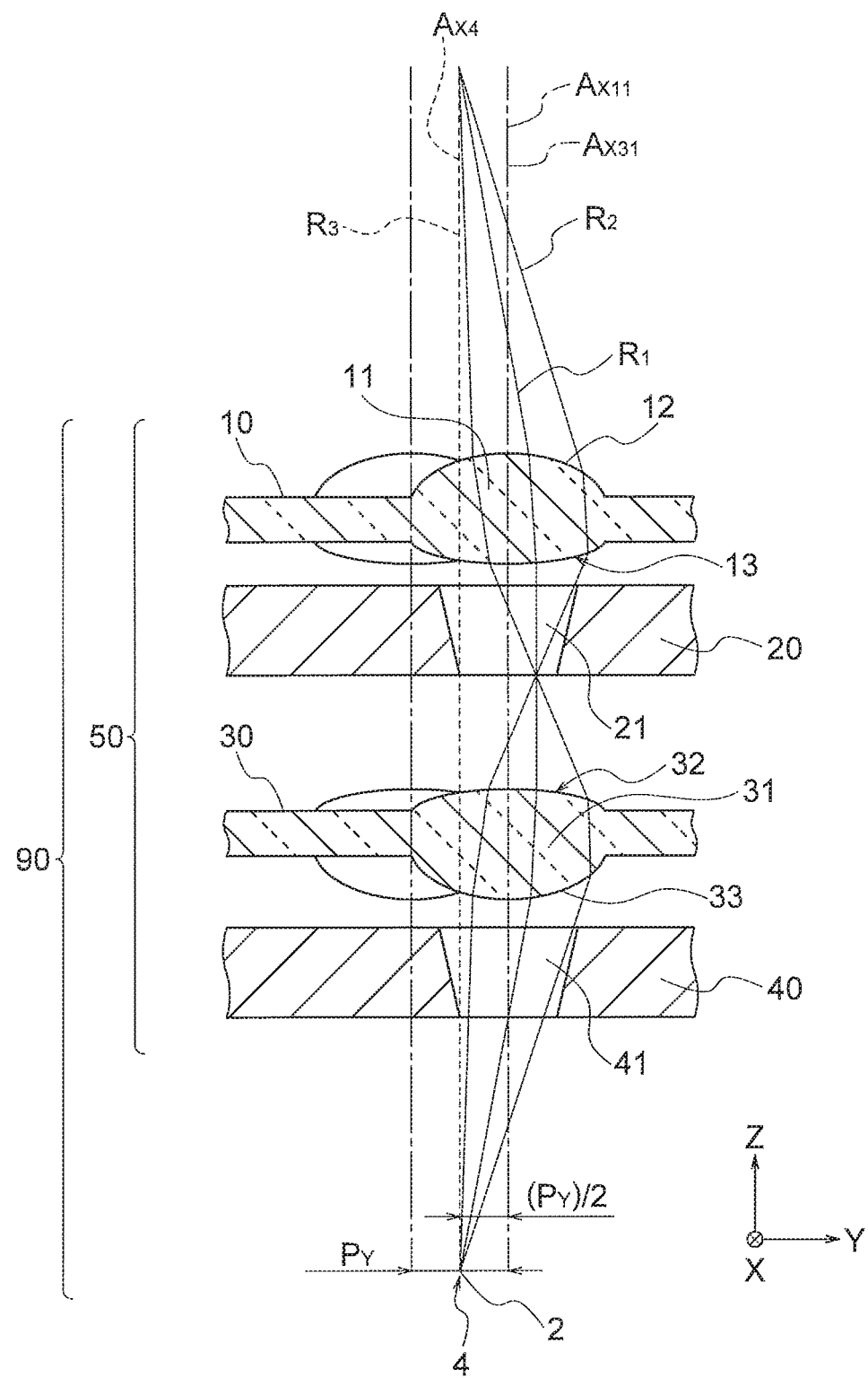
FIG. 9 is a cross-sectional view schematically illustrating a configuration of the lens unit according to the first embodiment.

FIG. 9 is a cross-sectional view schematically illustrating a configuration of the lens unit 50 according to the first embodiment. In FIG. 9, an optical axis of the lens surface 33 coincides with the vertical direction (Z direction) in FIG. 9. The LED array 4 is disposed below the lens unit 50 (in the −Z direction side) in FIG. 9, and an image formed by the lens unit 50 is provided above (in the +Z direction side) the lens unit 50 in FIG. 9. In FIG. 9, the optical axes of the lenses 11 and 31 of the lens unit 50 are indicated by alternate long and short dash lines. The optical axis of light emitted from the LED array 4 is indicated by a broken line.

As illustrated in FIG. 9, the position of an optical axis $A_{X11}$ of the lenses 11 in the Y direction and the position of an optical axis $A_{X31}$ of the lenses 31 in the Y direction are displaced from the position of an optical axis (center light beam) $A_{X4}$ of the LED devices of the LED array 4 by the length of $P_Y/2$ in the Y direction (+Y direction and the −Y direction). The position of the openings 21 in the Y direction and the position of the openings 41 in the Y direction coincide (substantially coincide) with the position of the optical axes of the lenses 11 in the Y direction and the position of the optical axes of the lenses 31 in the Y direction.

Figure 10:
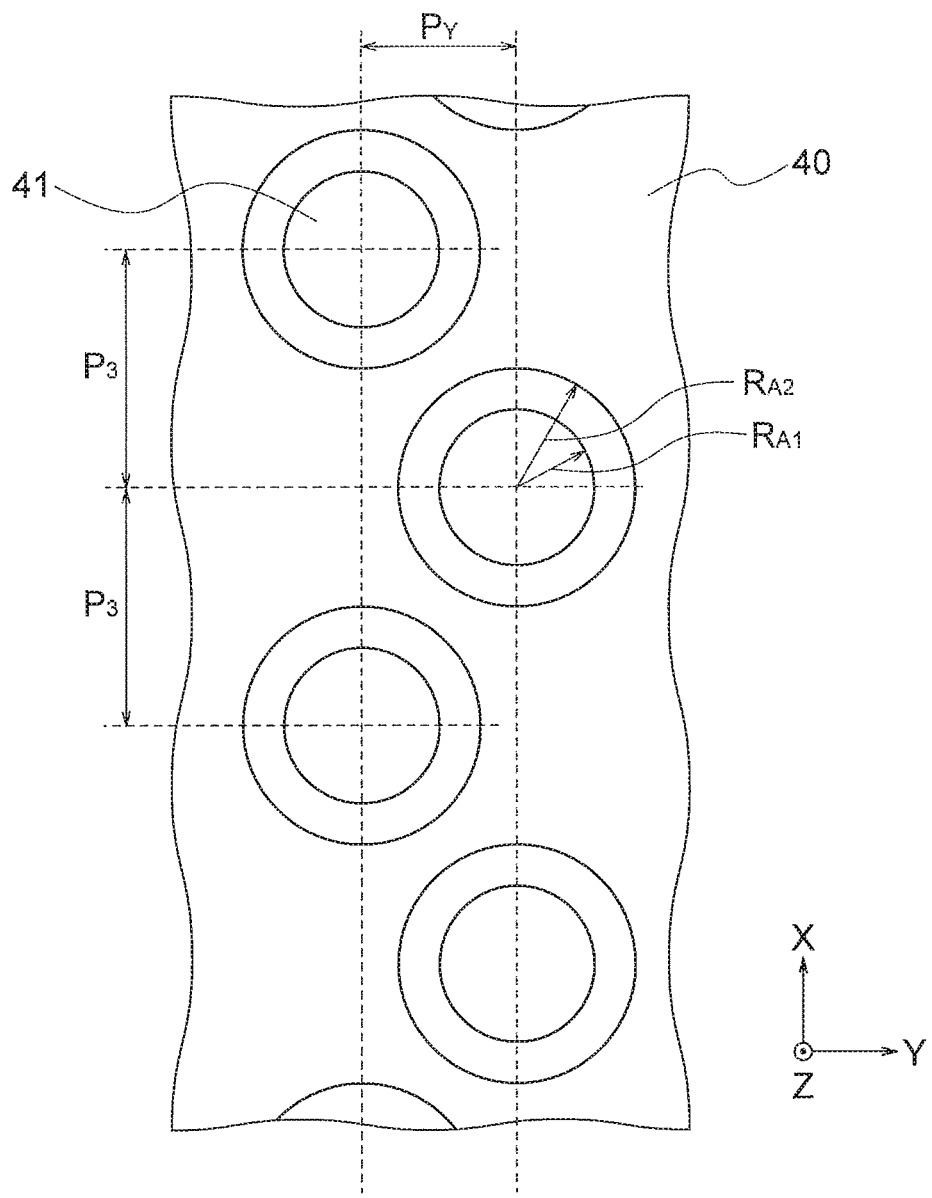
FIG. 10 is a top view schematically illustrating a configuration of a mask according to the first embodiment.

Referring to FIG. 10, a shape of the mask 40 will be described. FIG. 10 is a top view schematically illustrating a configuration of the mask 40 according to the first embodiment. FIG. 10 illustrates a surface of the mask 40 facing the second lens array 30 in a state in which the mask 40 is viewed in the −Z direction from the second lens array 30. The vertical direction (X direction) in FIG. 10 is a longitudinal direction of the mask 40. The mask 40 has the openings 41 arranged in a staggered pattern. The arrangement of the openings 41, however, is not limited to the staggered pattern. For example, the openings 41 may be linearly arranged.

As illustrated in FIG. 10, a pitch in the X direction between adjacent ones of the openings 41 is $P_3$ ($P_3=P_1$), and a pitch in each line of the openings 41 is $2 \times P_3$. A pitch in the Y direction between adjacent ones of the openings 41 is $P_Y$. Each of the openings 41 has an inverted truncated conical shape, and faces the second lens array 30 at one side and the LED array 4 at another side. An opening radius of the openings 41 at the side facing the second lens array 30 is $R_{A2}$. An opening radius of the openings 41 at the side facing the LED array 4 is $R_{A1}$. As illustrated in FIG. 10, the opening radius $R_{A1}$ is smaller than the opening radius $R_{A2}$. In other words, the opening radius of the openings 41 increases as it goes to the second lens array 30.

Figure 11:
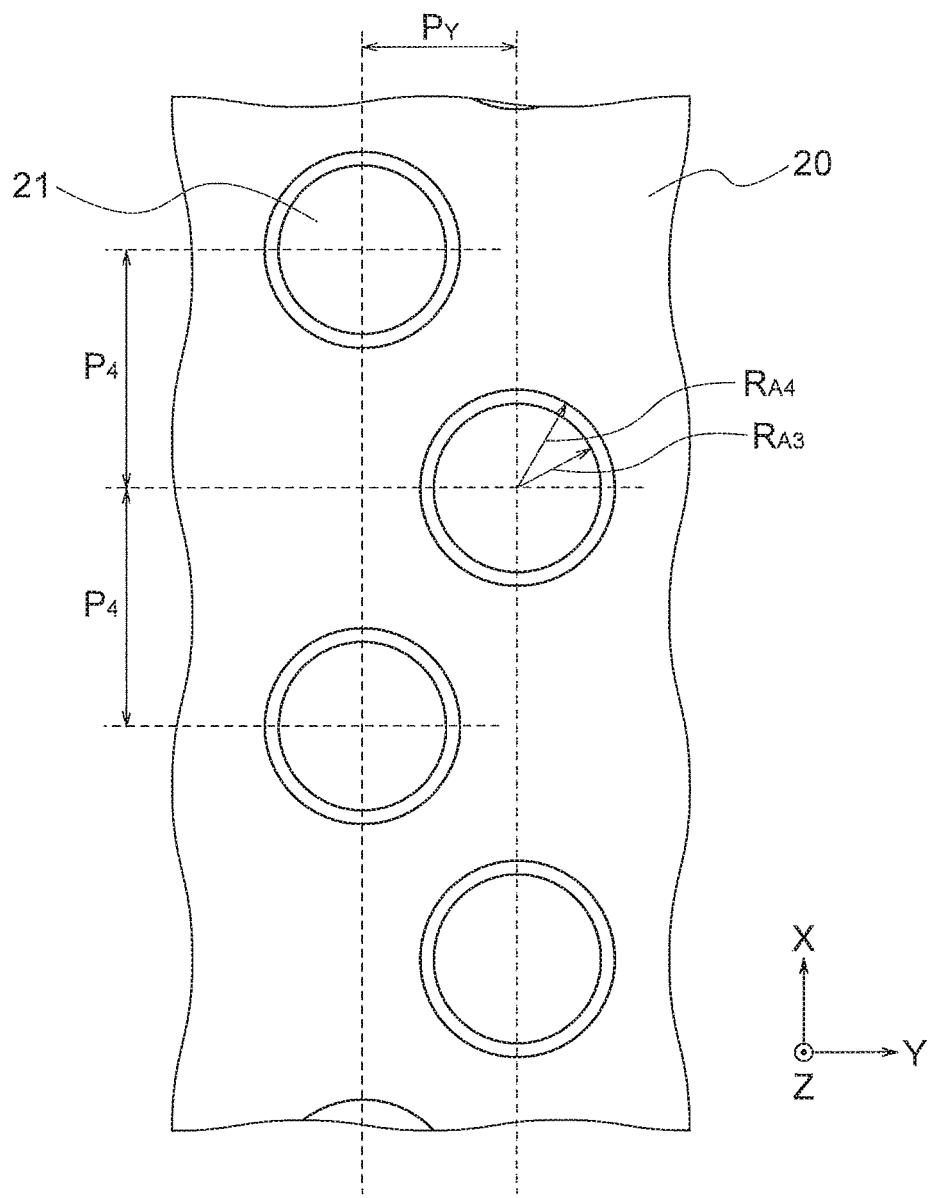
FIG. 11 is a top view schematically illustrating a configuration of a light shield plate according to the first embodiment.

Referring to FIG. 11, a shape of the light shield plate 20 will be described. FIG. 11 is a top view schematically illustrating a configuration of the light shield plate 20 according to the first embodiment. FIG. 11 illustrates a surface of the light shield plate 20 facing the first lens array 10 in a state in which the light shield plate 20 is viewed in the direction of the first lens array 10. The vertical direction (X direction) in FIG. 11 is a longitudinal direction of the light shield plate 20. The light shield plate 20 includes the openings 21 arranged in a staggered pattern. The arrangement of the openings 21, however, is not limited to the staggered pattern. For example, the openings 21 may be linearly arranged.

As illustrated in FIG. 11, a pitch in the X direction between adjacent ones of the openings 21 is $P_4$ ($P_4=P_1$), and a pitch in each line of the openings 21 is $2 \times P_4$. A pitch in the Y direction between adjacent ones of the openings 21 is $P_Y$. Each of the openings 21 has an inverted truncated conical shape, and faces the first lens array 10 at one side and the second lens array 30 at another side. An opening radius of the openings 21 at the side facing the first lens array 10 is $R_{A4}$. An opening radius of the openings 21 at the side facing the second lens array 30 is $R_{A3}$. As illustrated in FIG. 11, the opening radius $R_{A3}$ is smaller than the opening radius $R_{A4}$. In other words, the opening radius of the openings 21 increases as it goes to the first lens array 10.

Figure 12:
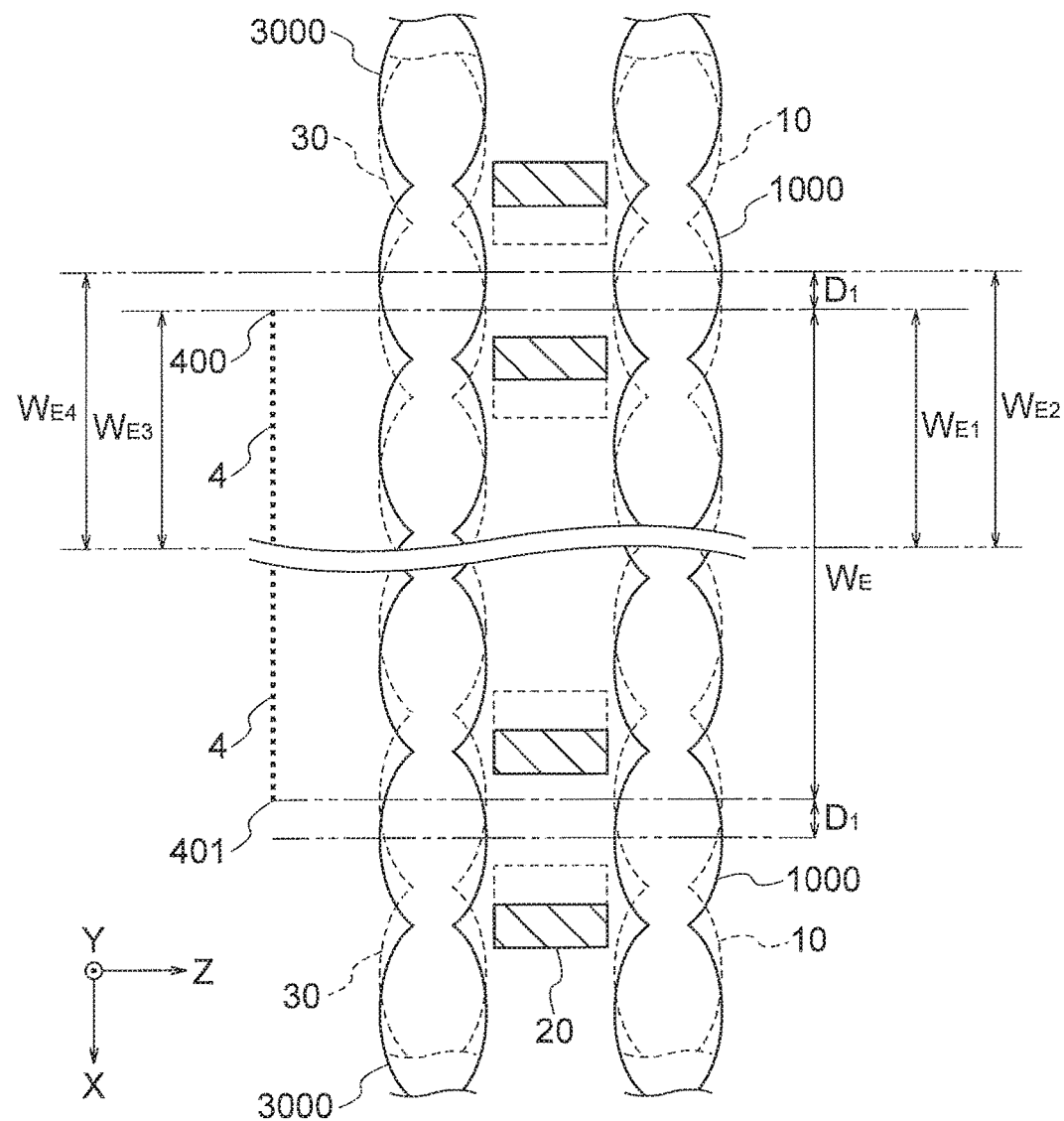
FIG. 12 is a cross-sectional view schematically illustrating a configuration of the LED head according to the first embodiment.

Referring to FIG. 12, a displacement amount between the LED devices 2 and the first lens array 10 caused by expansion and contraction of the lens unit 50 will be described. FIG. 12 is a cross-sectional view schematically illustrating a configuration of the LED head 90 according to the first embodiment. In FIG. 12, the longitudinal directions of the LED array 4 and the lens unit 50 coincide with the vertical direction (X direction) in FIG. 12. The LED array 4 is disposed on the left (in the −Z direction side) in FIG. 12, and an image formed by the LED array 4 is provided on the right (in the +Z direction side) in FIG. 12.

The LED devices at both ends of the LED array 4 in the longitudinal direction are indicated as LED devices 400 and

401. An upper half (to the −X direction side) in FIG. 12 shows an end of the LED head 90, and a lower half (to the +X direction side) in FIG. 12 shows the other end of the LED head 90. A center portion of the LED head 90 in the X direction is not shown.

In FIG. 12, the lens arrays indicated by dotted lines are the first lens array 10 and the second lens array 30 at a reference temperature $T_S$ as a first temperature. The lens arrays indicated by continuous lines are a first lens array 1000 and a second lens array 3000 that are extended (thermally expanded) at an upper limit temperature $T_H$ as a second temperature. In FIG. 12, optical axes of lenses of the first lens array 1000 extended at the upper limit temperature $T_H$ are indicated by chain double-dashed lines. Positions of the LED devices 400 and 401 in the X direction are indicated by chain double-dashed lines. The "reference temperature $T_S$" here refers to an initial temperature of the LED head 90 in a typical ambient temperature of an image forming apparatus (e.g., printer 100) including the lens unit 50 according to the first embodiment. The "upper limit temperature $T_H$" here refers to an increased temperature of the LED head 90 in a case where printing is continuously performed in a upper limit ambient temperature with which an operation of the printer 100 is assured. The temperature change in this case is 30° C. In consideration of extension of the lens array in this temperature range, banding in a printed image under the influence of the extension and contraction of the lenses can be reduced in a temperature range in which the printer 100 can operate.

As illustrated in FIG. 12, suppose a length in the X direction from a center position of the first lens array 10 to an end position of the first lens array 10 at the reference temperature $T_S$ is a first length $W_{E1}$, and a length in the X direction from the center position of the first lens array 10 to the end position of the first lens array 10 at the upper limit temperature $T_H$ is a second length $W_{E2}$, a displacement $D_1$ occurs between the first length $W_{E1}$ and the second length $W_{E2}$. From a coefficient of linear expansion $E_X$ and a length $W_E$ of the LED array 4, the displacement $D_1$ is obtained by Equation (1):

$$D_1 = E_X \cdot W_E (T_H - T_S)/2 \tag{1}$$

In the first embodiment, the first lens array 10 is configured in such a manner that the displacement $D_1$ is 25% or less of the pitch $P_1$ of the lenses 11. That is, the first lens array 10 is configured to satisfy Equation (2):

$$D_1 \leq 0.25 \cdot P_1 \tag{2}$$

Equation (1) is substituted into Equation (2), and then, $P_1$ is expressed by Equation (3):

$$P_1 \geq E_X \cdot W_E (T_H - T_S)/0.50 \tag{3}$$

The first lens array 10 according to the first embodiment is configured in such a manner that the pitch $P_1$ of the lenses 11 satisfies Equation (3). The pitch $P_1$ of the lenses 11 obtained by substituting a length $W_E$ of the LED array 4 according to the first embodiment of 288 [mm], a upper limit temperature $T_H$ of 55[° C.] from the upper limit of a usable temperature range of the LED head 90, a reference temperature $T_S$ of 25 [° C.], and a thermal expansion coefficient $E_X$ of 66×10$^{-6}$ [/° C.] of the first lens array 10 into Equation (3) is set at 1.14 [mm] or more. The pitch $P_1$ of the lenses 11 according to the first embodiment is, for example, 1.2 [mm].

From Equation (3), $E_X$ is expressed by Equation (4):

$$E_X \leq 0.5 \cdot P_1 / W_E (T_H - T_S) \tag{4}$$

As described above, the lens unit 50 according to the first embodiment is configured in such a manner that the coefficient of linear expansion $E_X$ of the first lens array 10 satisfies Equation (4).

A configuration of the second lens array 30 is the same as the configuration of the first lens array 10 except for an orientation of the lens surface. Suppose a length in the X direction from a center position of the second lens array 30 to an end position of the second lens array 30 at the reference temperature $T_S$ is a third length $W_{E3}$, and a length in the X direction from the center position of the second lens array 30 to the end position of the second lens array 30 at the upper limit temperature $T_H$ is a fourth length $W_{E4}$, a displacement $D_2$ occurs between the third length $W_{E3}$ and the fourth length $W_{E4}$. Suppose the displacement between the second lens array 30 and the LED devices 400 and 401 is $D_2$, the displacement $D_2$ is 25% or less of the pitch $P_2$ of the lenses 31. That is, the displacement $D_2$ satisfies Equation (5):

$$D_2 \leq 0.25 \cdot P_2 \tag{5}$$

Comparative Example

Figure 13:
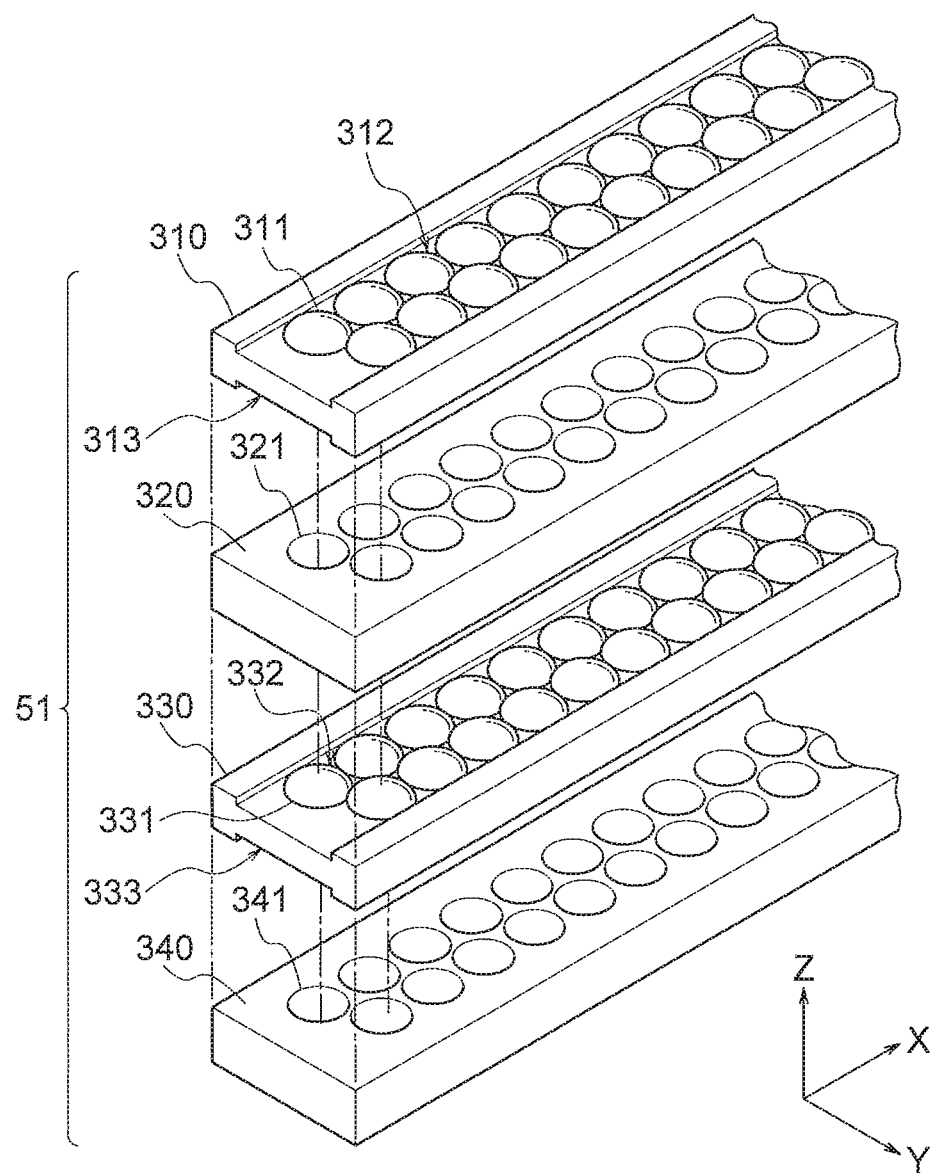
FIG. 13 is a disassembled perspective view in which a lens unit according to a comparative example is disassembled in a Z direction.

A configuration of a lens unit 51 according to a comparative example will now be described. FIG. 13 is a disassembled perspective view in which the lens unit 51 according to the comparative example is disassembled in a Z direction. As illustrated in FIG. 13, the lens unit 51 according to the comparative example is different from the lens unit 50 according to the first embodiment in the size, shape, and pitch of lenses formed in a lens array and the size, shape, and pitch of openings formed in a light shield plate and a mask. Other part of the configuration is the same as that of the lens unit 50 according to the first embodiment, and thus, description thereof will be partially omitted.

As illustrated in FIG. 13, the lens unit 51 is constituted by a stack of a lens array 310, a light shield plate 320, a lens array 330, and a mask 340, which are arranged in this order from above. The lens array 310 includes a plurality of lenses 311 each of which has a lens surface 312 and a lens surface 313. The lens array 330 includes a plurality of lenses 331 each of which has a lens surface 332 and a lens surface 333.

Figure 14:
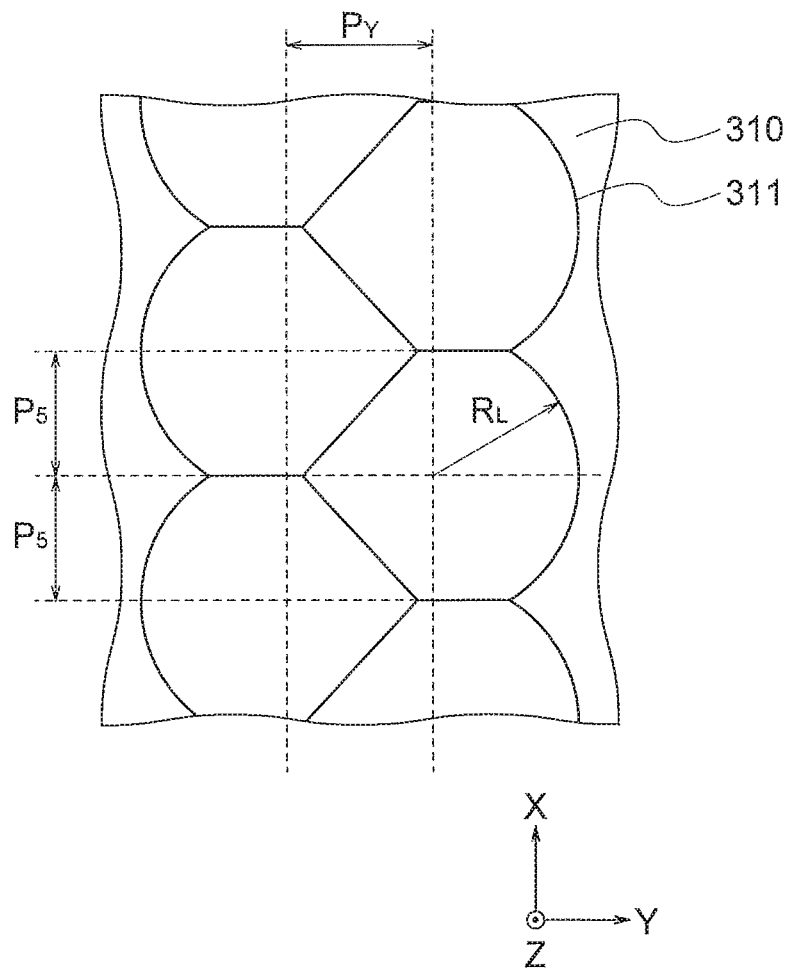
FIG. 14 is a top view schematically illustrating a configuration of a lens array according to the comparative example.

Referring to FIG. 14, a shape of the lens array 310 according to the comparative example will be described. FIG. 14 is a top view schematically illustrating a configuration of the lens array 310 according to the comparative example. The vertical direction (X direction) in FIG. 14 is a longitudinal direction of the lens array 310. The lens array 310 includes the lenses 311 arranged in a staggered pattern.

As illustrated in FIG. 14, a pitch in the X direction between adjacent ones of the lenses 311 is $P_5$, and a pitch in each line of the lenses 311 is 2×$P_5$. As shown in Table 1 below, the value of $P_5$ is smaller than the value of $P_1$. A pitch in a Y direction (transverse direction in FIG. 14) between adjacent ones of the lenses 311 is $P_Y$. A radius of the lenses 311 is $R_L$. In the lens array 310 according to the comparative example, the pitch $P_5$ is smaller than the radius $R_L$, and the boundary between adjacent ones of the lenses 311 is linear. A portion of the first lens array 310 where the lenses 311 are not formed is a flat surface.

A configuration of the lens array 330 is the same as the configuration of the lens array 310 except for an orientation of the lens surface in the X direction. A pitch between adjacent ones of the lenses 331 is $P_6$ ($P_6 = P_5$), and a pitch in each line of the lenses 331 is 2×$P_6$. A pitch in the Y direction (transverse direction in FIG. 14) between adjacent ones of the lenses 331 is $P_Y$. A radius of the lenses 331 is $R_L$.

Figure 15:
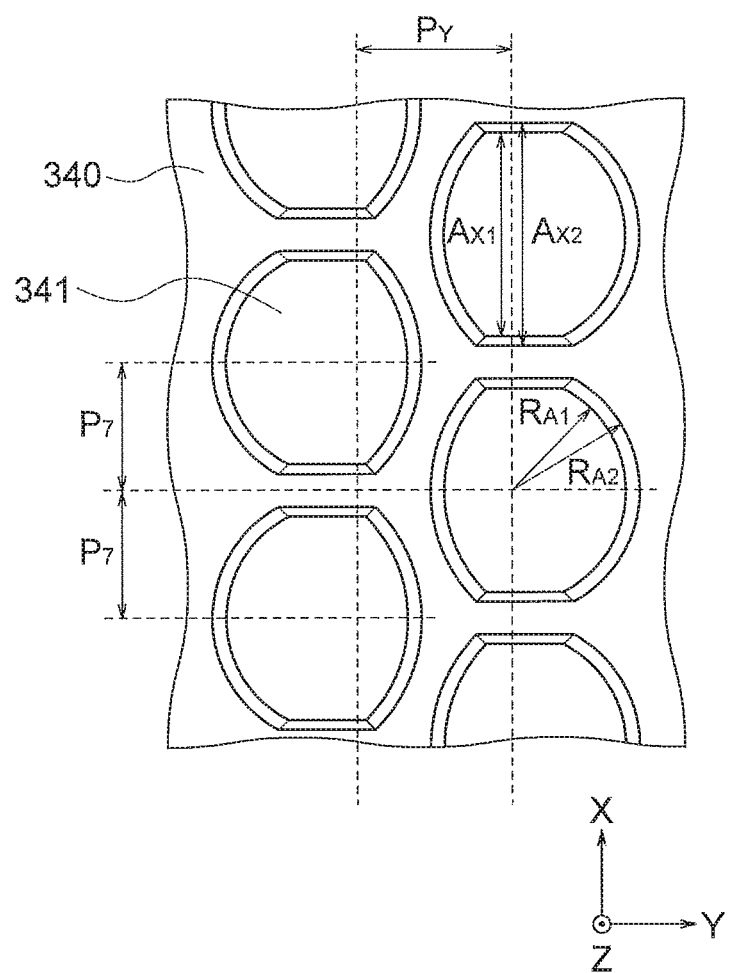
FIG. 15 is a top view schematically illustrating a configuration of a mask according to the comparative example.

Referring to FIG. 15, a shape of the mask 340 will be described. FIG. 15 is a top view schematically illustrating a configuration of the mask 340 according to the comparative example. FIG. 15 illustrates a surface of the mask 340 facing the lens array 310 in a state in which the mask 340 is viewed in the direction to the lens array 310. The vertical direction (X direction) in FIG. 14 is a longitudinal direction of the mask 340. The mask 340 has openings 341 arranged in a staggered pattern.

As illustrated in FIG. 15, a pitch in the X direction between adjacent ones of the openings 341 is $P_7$ ($P_7=P_5$), and a pitch in each line of the openings 341 is $2\times P_7$. A pitch in the Y direction between adjacent ones of the openings 341 is $P_Y$. Each of the openings 341 partially has a circular shape, and faces the lens array 330 at one side and the LED array 4 at another side. An opening radius of the openings 341 on the side facing the lens array 330 is $R_{A2}$, and a length thereof in the X direction is $A_{X1}$. An opening radius of the openings 341 on the side facing the LED array 4 is $R_{A1}$, and a length thereof in the X direction is $A_{X1}$. As illustrated in FIG. 15, the opening radius $R_{A1}$ is smaller than the opening radius $R_{A2}$. In addition, $A_{X2}$ is longer than $A_{X1}$.

Figure 16:
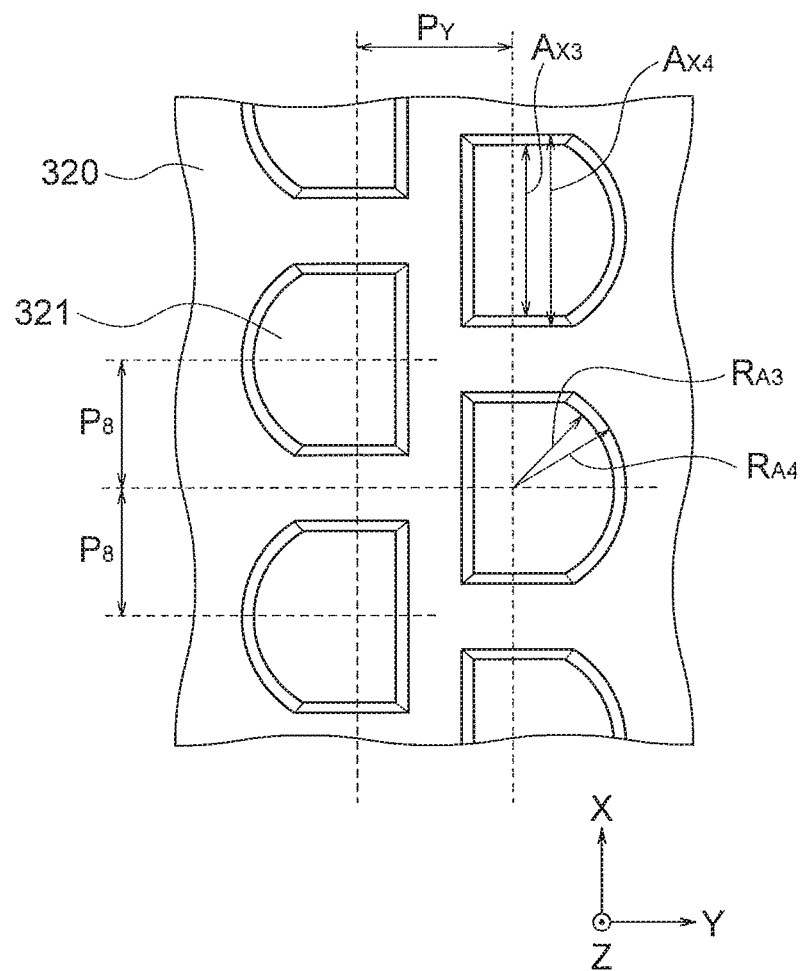
FIG. 16 is a top view schematically illustrating a configuration of a light shield plate according to the comparative example.

Referring to FIG. 16, a shape of the light shield plate 320 will be described. FIG. 16 is a top view schematically illustrating a configuration of the light shield plate 320 according to the comparative example. FIG. 16 illustrates a surface of the light shield plate 320 facing the lens array 310 in a state in which the light shield plate 320 is viewed in the direction of the lens array 310. The vertical direction (X direction) in FIG. 16 is a longitudinal direction of the light shield plate 320. The light shield plate 320 includes openings 321 arranged in a staggered pattern.

As illustrated in FIG. 16, a pitch in the X direction between adjacent ones of the openings 321 is $P_8$ ($P_8=P_5$), and a pitch in each line of the openings 321 is $2\times P_8$. A pitch in the Y direction between adjacent ones of the openings 321 is $P_Y$. Each of the openings 321 partially has a circular shape, and faces the lens array 310 at one side and the lens array 330 at another side. An opening radius of the opening 321 on the side facing the lens array 310 is $R_{A4}$, and a length thereof in the X direction is $A_{X4}$. An opening radius of the opening 321 on the side facing the lens array 330 is $R_{A3}$, and a length thereof in the X direction is $A_{X3}$. As illustrated in FIGS. 9 and 10, the opening radius $R_{A3}$ is smaller than the opening radius $R_{A4}$. In addition, $A_{X4}$ is longer than $A_{X3}$.

Each of the pitches $P_1$ to $P_8$ of the lenses in the X direction is also referred to as $P_X$, and each of the displacements $D_1$ and $D_2$ and the displacement amount of the lens array according to the comparative example is also referred to as $D_X$. The first lens array 10, the second lens array 30, the lens array 310, and the lens array 330 are also referred to as lens arrays.

1-2. Operation

First, an operation of the printer 100 as the image forming apparatus having the configuration described above will be described with reference to FIG. 1. The surface of the photosensitive drum 5 is given an electric charge by the charging roller 67 to which a voltage is applied and is uniformly charged. Next, the surface of the rotating photosensitive drum 5 is exposed to light by the LED head 90 so that an electrostatic latent image is formed on the surface of the photosensitive drum 5. The electrostatic latent image is developed by the developing unit 65 so that a toner image is formed on the surface of the photosensitive drum 5. Meanwhile, the paper sheet 102 placed in the paper cassette 60 is taken out from the paper cassette 60 by the paper feed roller 61, and the conveying rollers 62 and 63 convey the paper sheet 102 to a vicinity of the transfer roller 69 and the transfer belt 68. Thereafter, when rotation of the photosensitive drum 5 causes the toner image on the surface of the photosensitive drum 5 obtained by the development to reach a vicinity of the transfer roller 69 and the transfer belt 68, the transfer roller 69 and the transfer belt 68 to which a voltage is applied cause the toner image on the surface of the photosensitive drum 5 to be transferred onto the paper sheet 102. Subsequently, the paper sheet 102 having the surface on which the toner image is formed is conveyed to the fixing unit 71 by rotation of the transfer belt 68. The toner image on the paper sheet 102 is heated under pressure to be melt and is fixed onto the paper sheet 102 by the fixing unit 71. The paper sheet 102 is then ejected to the ejection unit 73 by the conveying roller 72 and the ejection roller 74, and the operation of the printer 100 is finished.

Next, an operation of the LED head 90 will be described with reference to FIG. 3. When a control signal for the LED head 90 is issued by a control device of the printer 100 based on image data, the LED devices 2 emit any optional amount of light. Light beams from the LED devices 2 enter the lens unit 50 and form an image on the photosensitive drum 5.

In FIG. 8, light beams emitted from the LED devices 2 near an optical axis of the lens surface 33 are represented by $R_1$, $R_2$, and $R_3$. A light beam emitted from the LED device 2 away from the optical axis is represented by $R_4$. Light beams from the LED array 4 enter the lens surface 33 so that a reduced inverted image of the LED array 4 is formed at an intermediate location between the lens surface 32 and the lens surface 13. Then, the light beams from the LED array 4 enter the lens surface 13 so that an enlarged inverted image of the reduced inverted image of the LED array 4 is formed at an imaging position. That is, an equal-magnification erect image of the LED array 4 is formed at the imaging position by the lens unit 50.

Dimensions and other features of the lens unit 50 according to the first embodiment and the lens unit 51 according to the comparative example will be specifically described. The lens arrays (the first lens array 10, the second lens array 30, the lens array 310, and the lens array 330) of the lens unit 50 according to the first embodiment and the lens unit 51 according to the comparative example had a coefficient of linear expansion of $66\times10^{-6}$ [/° C.]. Here, the coefficient of linear expansion of each of the lens arrays is calculated by increasing the temperature from 25 [° C.] to 55 [° C.] using a silicone cord heater and measuring the overall length of the lens array in the longitudinal direction at these temperatures with a measuring microscope.

Each of the lens arrays (first lens array 10 and second lens array 30) according to the first embodiment and the lens arrays (lens array 310 and lens array 330) according to the comparative example has a plurality of lenses arranged in the range of 300 [mm] in the X direction. The first lens array 10, the second lens array 30, the lens array 310, and the lens array 330 were produced by using cyclo-olefin resin, "ZEONEX E48R" (registered trademark, produced by Zeon Corporation). A refractive index of this material at 770 [nm], which is an emission wavelength of the LED devices 2, is 1.5247. The light shield plate 20, the mask 40, the light shield plate 320, and the mask 340 were produced by using polycarbonate resin, "TARFLONGZK3100" (registered trademark, produced by Idemitsu Kosan Co., Ltd.). The other dimensions are shown in Table 1.

TABLE 1

| Member | Portion | Item | Example of first embodiment | Comparative example |
|---|---|---|---|---|
| Lens array (30, 330) | Thickness | $L_T$ | 1.3 | 1.3 |
| | Surface interval | $L_G$ | 2.2 | 2.2 |
| | Lens surface (33, 333) | $P_X$ | 1.2 | 0.6 |
| | | $P_Y$ | 0.4 | 0.8 |
| | | $R_L$ | 0.75 | 0.7 |
| | Lens surface (32, 323) | $R_L$ | 0.6 | 0.55 |
| Lens array (10, 310) | Lens surface (13, 313) | $R_L$ | 0.75 | 0.7 |
| | Lens surface (12, 312) | $R_L$ | 0.6 | 0.55 |
| Mask (40, 340) | Thickness | $M_T$ | 1 | 1 |
| | Surface interval | $L_{FM}$ | 1.9 | 1.95 |
| | Opening | $R_{A1}$ | 0.35 | 0.7 |
| | | $R_{A2}$ | 0.6 | 0.72 |
| | | $A_{X1}$ | — | 0.4 |
| | | $A_{X2}$ | — | 0.42 |
| Light shield plate (20, 320) | Thickness | $S_T$ | 1 | 1 |
| | Surface interval | $L_{FS}$ | 1.1 | 1.1 |
| | Opening | $R_{A3}$ | 0.45 | 0.5 |
| | | $R_{A4}$ | 0.48 | 0.52 |
| | | $A_{X3}$ | — | 0.45 |
| | | $A_{X4}$ | — | 0.47 |

Shapes of the lens surfaces of the lens arrays (first lens array 10 and second lens array 30) according to the first embodiment and the lens arrays (lens array 310 and lens array 330) according to the comparative example will now be described with reference to Table 2. Each of the lens surfaces is a rotationally aspherical surface, and represented by a radius of curvature and fourth, sixth, and eighth order aspheric coefficients. The lens surface 12 has the same shape as that of the lens surface 33, and the orientation of the lens surface is rotated by 180 degrees about the rotation axis. The lens surface 13 has the same shape as that of the lens surface 32, and the orientation of the lens surface is rotated by 180 degrees about the rotation axis. The lens surface 312 has the same shape as that of the lens surface 333, and the orientation of the lens surface is rotated by 180 degrees about the rotation axis. The lens surface 313 has the same shape as that of the lens surface 332, and the orientation of the lens surface is rotated by 180 degrees about the rotation axis.

TABLE 2

| Lens surface | Item | Example of embodiment | Comparative example |
|---|---|---|---|
| Lens surface (12, 33, 312, 333) | Radius of curvature | 0.8286 | 0.8431 |
| | Fourth order aspheric coefficients | −0.2900 | −0.3031 |
| | Sixth order aspheric coefficients | 0.3148 | 0.3825 |
| | Eighth order aspheric coefficients | −0.7411 | −0.7052 |
| Lens surface (13, 32, 313, 332) | Radius of curvature | 1.1656 | 1.1298 |
| | Fourth order aspheric coefficients | −0.4768 | −0.4494 |
| | Sixth order aspheric coefficients | −0.2648 | −0.1655 |
| | Eighth order aspheric coefficients | −0.5710 | −0.9536 |

Print evaluation results showing advantages of the first embodiment will now be described. The lens arrays of the first embodiment and the comparative example were mounted on an A3-size LED head 90 having a resolution of 1200 [dpi], a length $W_E$ of the LED array 4 of 288 [mm], and then on a color LED printer, the quantity of light is corrected at a reference temperature $T_S$ of 25 [° C.], and print evaluation is carried out at a temperature $T_H$ of 55 [° C.].

Excellent print results were obtained for printed images of the color LED printer on which the lens unit 50 according to the first embodiment is mounted. On the other hand, for the color LED printer on which the lens unit 51 according to the comparative example is mounted, banding (periodic vertical stripes) having the frequency same as a lens surface pitch $P_5=P_6=P_7=P_8$ of 0.6 [mm] is observed, in both ends of each printed image corresponding to both ends of each of the lens arrays 310 and 330 in the longitudinal direction.

The optical image measuring device for correcting the quantity of light of the LED head 90 will now be described with reference to FIGS. 17 and 18.

Figure 17:
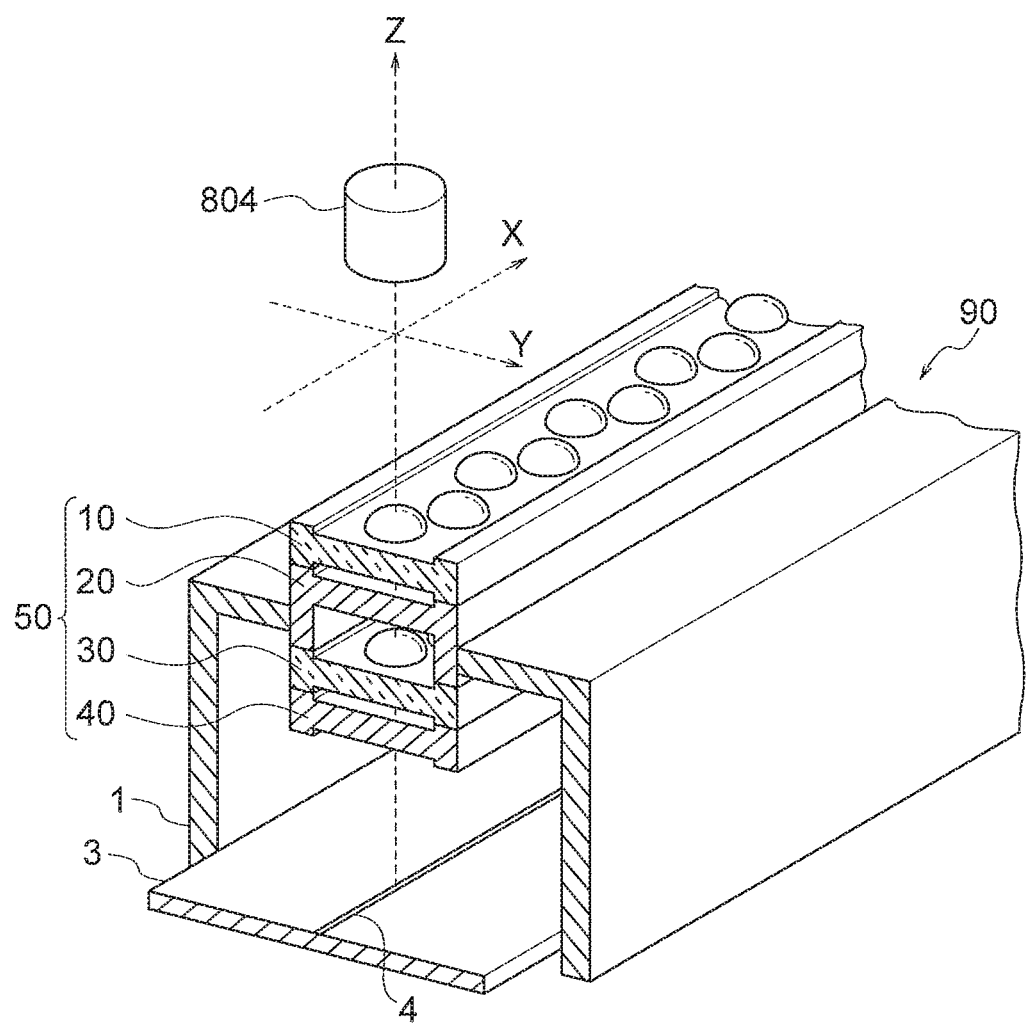
FIG. 17 is a perspective view schematically illustrating a configuration including a photosensor as an optical image measuring device and the LED head as a test object according to the first embodiment.

FIG. 17 is a perspective view schematically illustrating a configuration including a photosensor 804 as an optical image measuring device and the LED head 90 as a test object according to the first embodiment. As illustrated in FIG. 17, the photosensor 804 is disposed near an imaging position of the LED head 90 (above the LED head 90 in FIG. 17). The photosensor 804 measures the quantity of light on an imaging plane of the lens unit 50 of the LED head 90, that is, at an imaging position apart from the lens surface 12 facing the photosensitive drum 5 by a length $L_I$ for each of the LED devices 2. The photosensor 804 scans (moves) along the longitudinal direction of the LED head 90 (the X direction). The photosensor 804 operates in such a manner that the position of the photosensor 804 in the X direction coincides with the position of the illuminated LED device 2 in the LED head 90.

Figure 18:
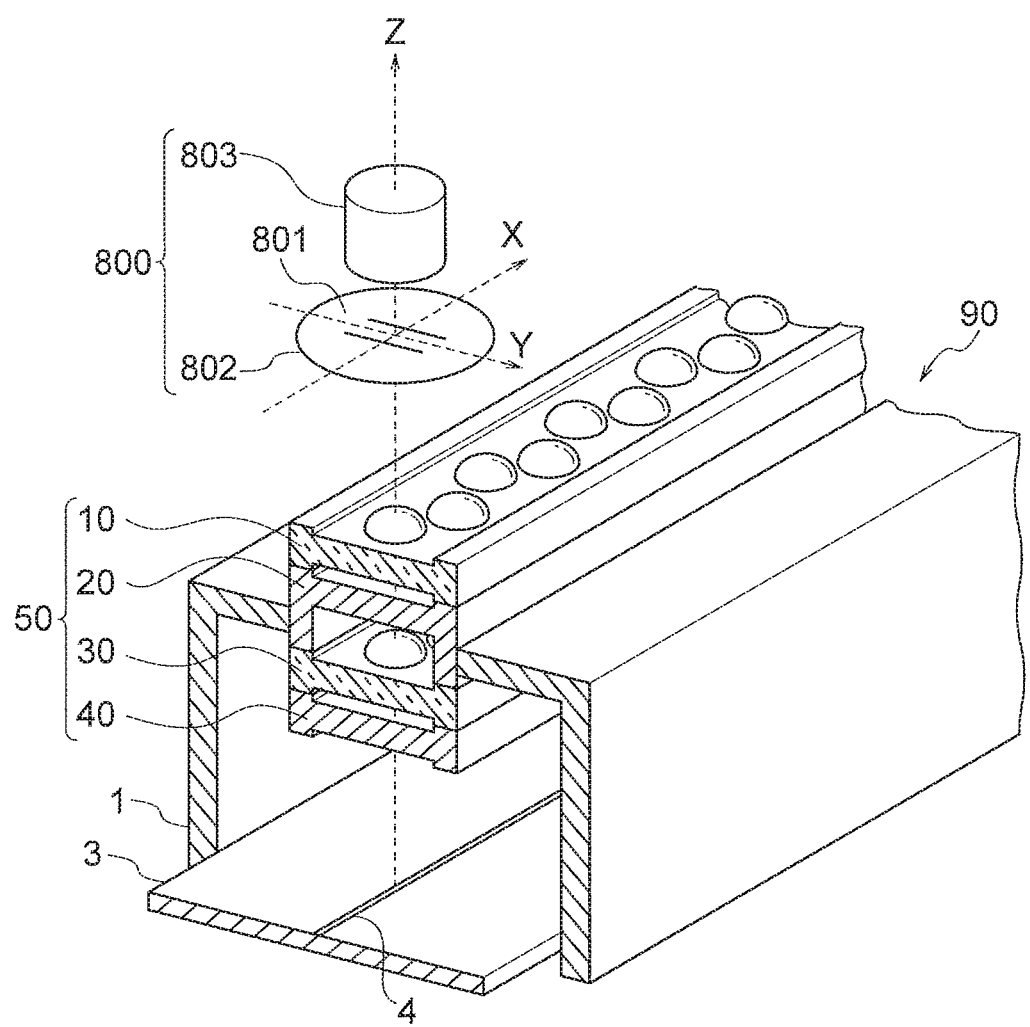
FIG. 18 is a perspective view schematically illustrating a configuration including a slit sensor as an optical image measuring device and the LED head as a test object according to the first embodiment.

FIG. 18 is a perspective view schematically illustrating a configuration including a slit sensor 800 as an optical image measuring device and the LED head 90 as a test object according to the first embodiment. As illustrated in FIG. 18, the slit sensor 800 is disposed near an imaging position of the LED head 90 (above the LED head 90 in FIG. 17). The slit sensor 800 includes a light shield plate 802 having a slit 801 and a photosensor 803 serving as a photodetector used for detecting light passing through the slit 801. The slit 801 is a long shape hole elongated in the Y direction perpendicular to the X direction in which the LED devices 2 are arranged. Light beams that have passed through the slit 801 are detected by the photosensor 803, and the photosensor 803 outputs an electrical signal with a value (current value, voltage value, or charge amount) in accordance with the quantity of received light. The slit sensor 800 scans (moves) in the X direction, and a distribution of light quantity of an image (shown in FIG. 20A described below, for example) is measured for each of the LED devices 2.

Figure 19:
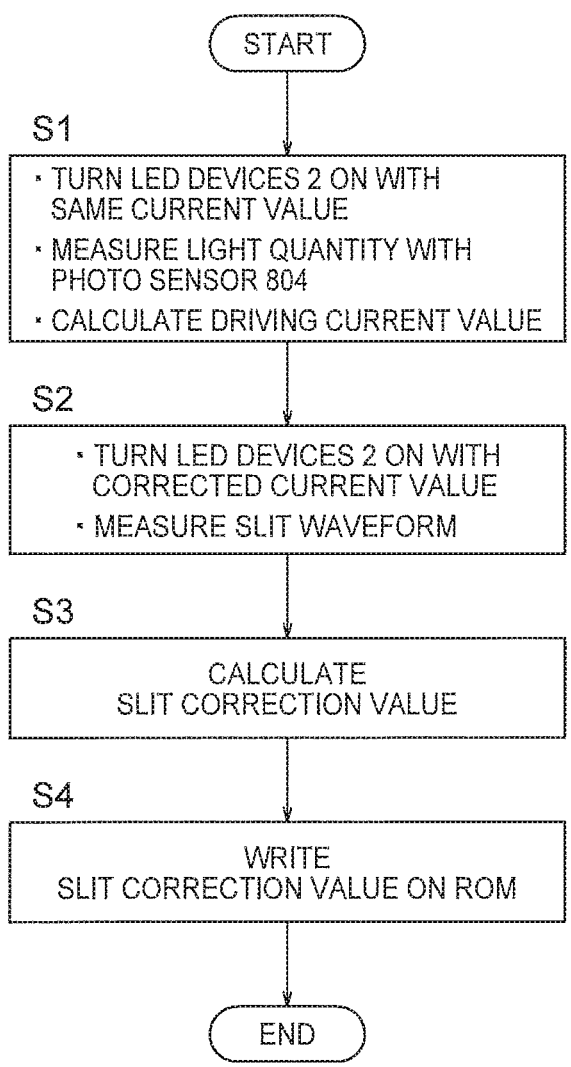
FIG. 19 is a flowchart of an operation of slit correction using the optical image measuring device according to the first embodiment.

A method for setting a driving current for the plurality of LED devices 2 will now be described with reference to FIG. 19 and FIGS. 20A and 20B. FIG. 19 is a flowchart of an operation of slit correction using the optical image measuring device according to the first embodiment. As illustrated in FIG. 19, first, in step S1, the LED devices 2 of the LED head 90 are illuminated with a driving current having the same current value, and the photosensor 804 is moved in the X direction so that the photosensor 804 measures the quantity of light (light quantity value) emitted by the LED devices 2 dot by dot. On the basis of the measured light quantity values of the LED devices 2, a current value of a driving current of the LED devices 2 at which the LED devices 2 have the same light quantity values is calculated.

Figure 20A:
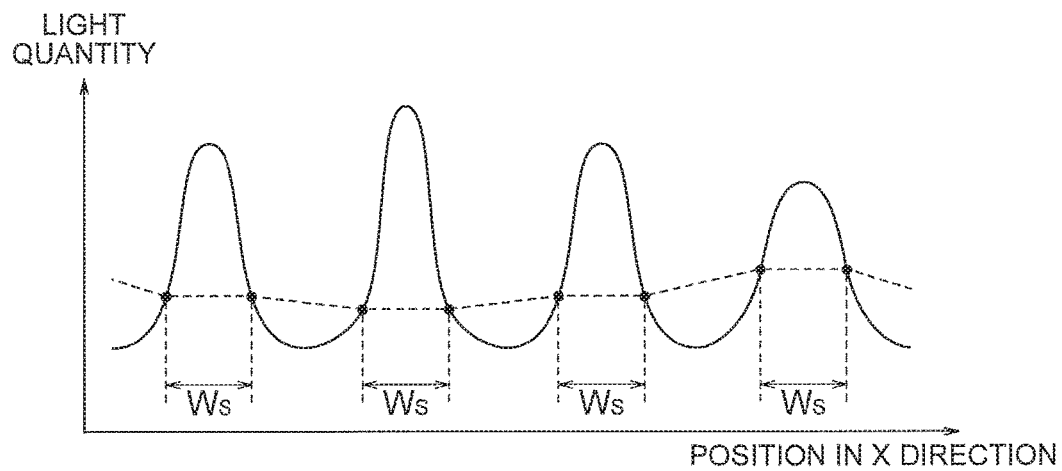
FIG. 20A is a graph showing a slit waveform of an LED device measured in step S2 of the flowchart of FIG. 19.

Next, in step S2, the calculated current value is used as a corrected driving current value, the LED devices 2 of the LED head 90 are illuminated with the corrected driving current value, and a slit waveform that is a waveform of an image formed by the LED devices is measured with the slit sensor 800 (as shown in FIG. 20A, described below, for example).

Thereafter, in step S3, a current value of the driving current for the LED devices 2 with which the slit waveforms of all the LED devices 2 have the same cross section is calculated from the slit waveform measured in step S2, and the obtained current value is used as a corrected current value subjected to the slit correction. Subsequently, in step S4, the corrected current value subjected to the slit correction is written on a read only memory (ROM) that is an information memory device of the LED head 90.

FIG. 20A is a graph showing an example of the slit waveform of the LED devices 2 measured in step S2 in FIG. 19. The LED devices 2 are controlled to emit the same quantity of light by using a light quantity correcting value. As illustrated in FIG. 20A, the heights (quantities of light) of a slit waveform at which the widths associated with individual LED devices 2 in a direction corresponding to the X direction are $W_S$ are not uniform, that is, differ among the LED devices, as indicated by a broken line in FIG. 20A.

Figure 20B:
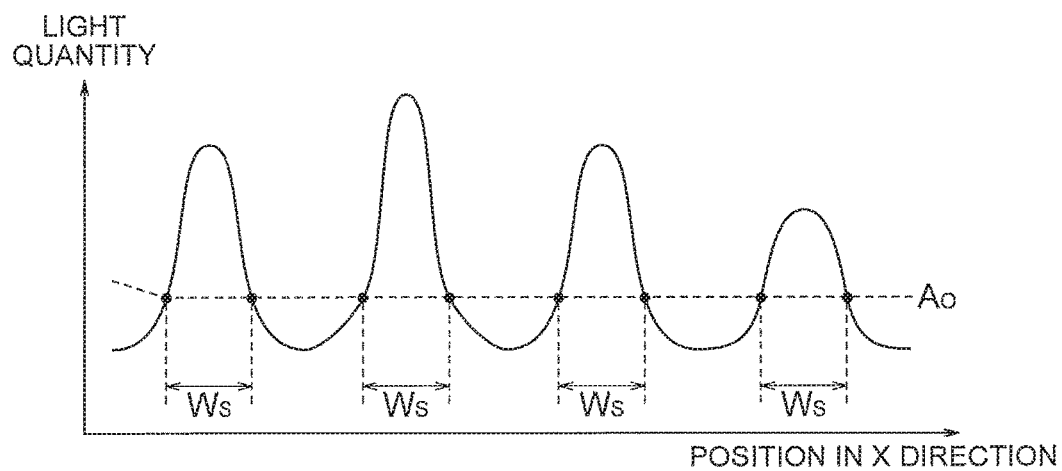
FIG. 20B is a graph showing a slit waveform of an LED device having an uniform wave height and a width $W_S$ in the slit waveform.

FIG. 20B is a graph showing an example of a corrected slit waveform of the LED devices 2 in which the heights (quantities of light) of a slit waveform at which the widths associated with individual LED devices 2 in a direction corresponding to the X direction are $W_S$ are at a uniform level $A_0$. As illustrated in FIG. 20B, in the corrected slit waveform, the heights of the slit waveform at which the slit waveform has the width $W_S$ are uniform. In the LED heads 90 of the first embodiment and the comparative example, a current value subjected to slit correction is calculated so that the heights (quantities of light) at which the slit waveform had a width $W_S$ of 60 [μm] were uniform.

Figure 21A:
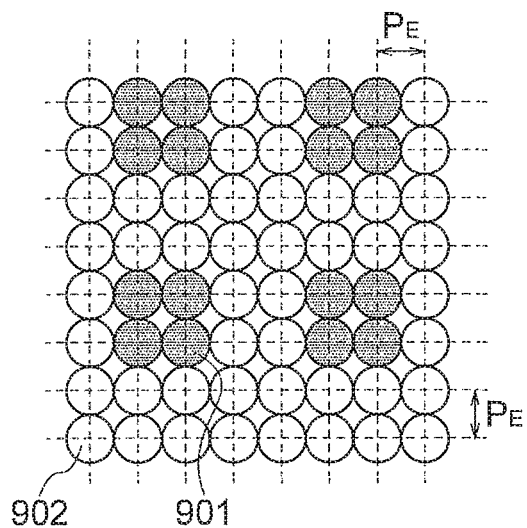
FIGS. 21A through 21C are views in which illuminated LEDs are indicated by white circles and extinguished LEDs are hatched in an evaluation test of a printed image.
Figure 21B:
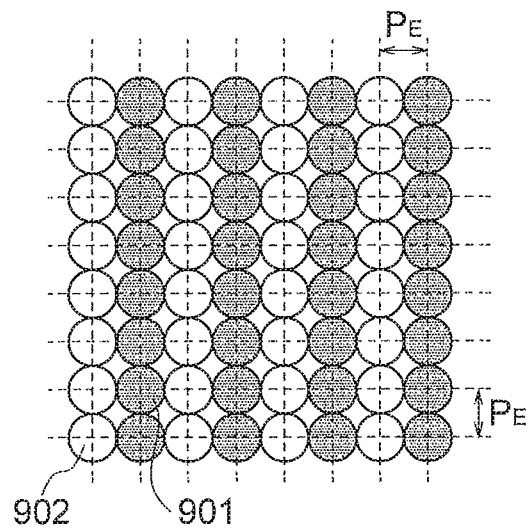
Figure 21C:
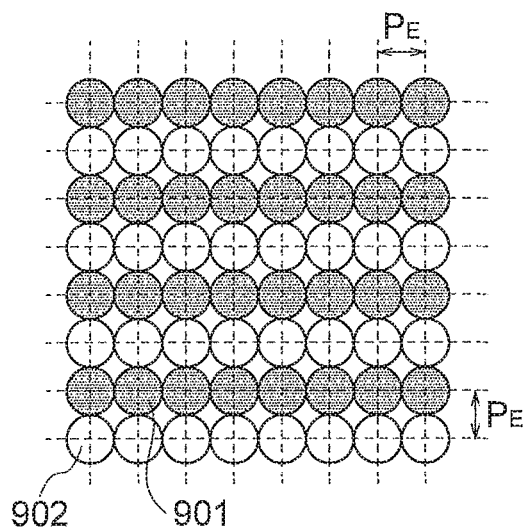

A method for a print evaluation test of the image forming apparatus according to the first embodiment will now be described with reference to FIGS. 21A through 21C. FIGS. 21A through 21C are views in which illuminated LED devices 902 are indicated by white circles and extinguished LED devices 901 are indicated by hatched circles in the print evaluation test. The pitch of the plurality of LED devices is $P_E$.

In the print evaluation test, a color LED printer on which the LED head 90 having a resolution of 1200 [dpi] is mounted is used, a printed image formed by continuously illuminating the LED devices illustrated in FIG. 21A by two dots and continuously extinguishing the LED devices by two dots, an image in which vertical thin lines are formed in the Y direction, illustrated in FIG. 21B, which is the direction of conveyance of the paper sheet 102, and an image in which vertical thin lines are formed in the X direction which is the direction of arranging the LED devices 2 illustrated in FIG. 21C, were printed, and an image with neither vertical stripes (banding) nor density unevenness is evaluated as good.

The print evaluation test will be more specifically described. In the print evaluation test, the quantity of light is corrected with a resolution of the lens arrays according to the first embodiment and the comparative example of 1200 [dpi], a length $W_E$ of the LED array 4 of 288 [mm], and a reference temperature $T_S$ of 25 [° C.], the circuit board 3 is moved in the arrangement direction of the LED devices 2 so that a displacement amount $D_X$ is intentionally caused between the lens surface and the LED devices 2, thereby measuring print evaluation results at the reference temperature $T_S$ of 25 [° C.].

The results of the print evaluation test will now be described with reference to Table 3. In the print evaluation test, with a large displacement amount $D_X$, banding (vertical stripes) occurred on a cycle corresponding to the pitch $P_X$ of the lens surface of the lens array in an entire printed image. A case where this banding occurred is marked as not good and a case where no such banding occurred is marked as good.

TABLE 3

| | | Displacement amount $D_X$ [mm] | | | | |
|---|---|---|---|---|---|---|
| | | 0.09 | 0.15 | 0.18 | 0.30 | 0.36 |
| Examples of first embodiment | $(D_X/P_X) \times 100\%$ Print evaluation | 8% good | 13% good | 15% good | 25% good | 30% not good |
| Comparative example | $(D_X/P_X) \times 100\%$ Print evaluation | 15% good | 25% good | 30% not good | 50% not good | 60% not good |

Table 3 shows that in the lens unit 50 according to the first embodiment, no banding occurred in the range of displacement amount $D_X$ from 0.09 [mm] to 0.30 [mm], and banding occurred at 0.36 [mm]. In the lens unit 51 according to the comparative example, in the range of displacement amount $D_X$ from 0.09 [mm] to 0.15 [mm], no banding occurred, whereas in the range from 0.18 [mm] to 0.36 [mm], banding occurred.

Regarding the value of $(D_X/P_X) \times 100(\%)$ calculated from the displacement amount $D_X$ and the pitch $P_X$ of the lens surface, no banding occurred when the value of $(D_X/P_X) \times 100(\%)$ is 25% or less, no banding occurred, and when the value is 30% or more, banding occurred in each of the first embodiment and the comparative example. That is, if the displacement amount $D_X$ between the LED devices 2 and the lens array is 25% or less of the pitch $P_X$ of the plurality of lenses in the X direction, no banding occurs.

From the foregoing results of the print evaluation test, although the lens unit 50 according to the first embodiment and the lens unit 51 according to the comparative example show not only different pitches $P_X$ of the lens arrays but also significantly different optical properties, if the displacement amount $D_X$ between the LED devices 2 and the lens array is 25% or less of the pitch $P_X$ of the plurality of lenses in the X direction, no banding occurs. Thus, it is confirmed that conditions for not causing banding do not depend on optical properties, but depend only on the pitch $P_X$ of the plurality of lenses in the X direction.

In addition, from the result that although the lens unit 50 according to the first embodiment and the lens unit 51 according to the comparative example show different pitches $P_X$, if the displacement amount $D_X$ between the LED devices 2 and the lens array is 25% or less of the pitch $P_X$ of the plurality of lenses in the X direction, no banding occurred, it is also confirmed that conditions for not causing no banding do not depend on the pitch $P_Y$ but depend only on the pitch $P_X$.

That is, in investigating advantages of the first embodiment, the lens arrays of the first embodiment and the comparative example were lens arrays in which lenses were arranged in a staggered pattern. However, in a lens array in which a plurality of lenses are linearly arranged in a line, no banding occurs as long as the displacement amount $D_X$ between the LED devices 2 and the lens surface is 25% or less of the pitch $P_X$ of the plurality of lenses in the X direction. Thus, conditions for not causing banding do not depend on optical properties but depend only on the pitch $P_X$.

1-3. Advantages

In the lens unit 50 according to the first embodiment, the displacement amount $D_X$ between the LED devices 2 and the lens array is 25% or less of the pitch $P_X$ between lenses adjacent in the X direction so that printing failures (e.g., occurrence of banding) due to expansion and contraction of the lens array caused by a temperature change can be reduced. In the configurations of the lens arrays 10 and 30 according to the first embodiment, the pitches of the lenses 11 and 31 are larger than a predetermined pitch so that printing failures due to expansion and contraction of the lens arrays 10 and 30 caused by a temperature change can be reduced. The coefficients of linear thermal expansion of the lens arrays 10 and 30 are smaller than a predetermined value so that printing failures can be reduced.

2. Second Embodiment

2-1. Configuration

Figure 22:
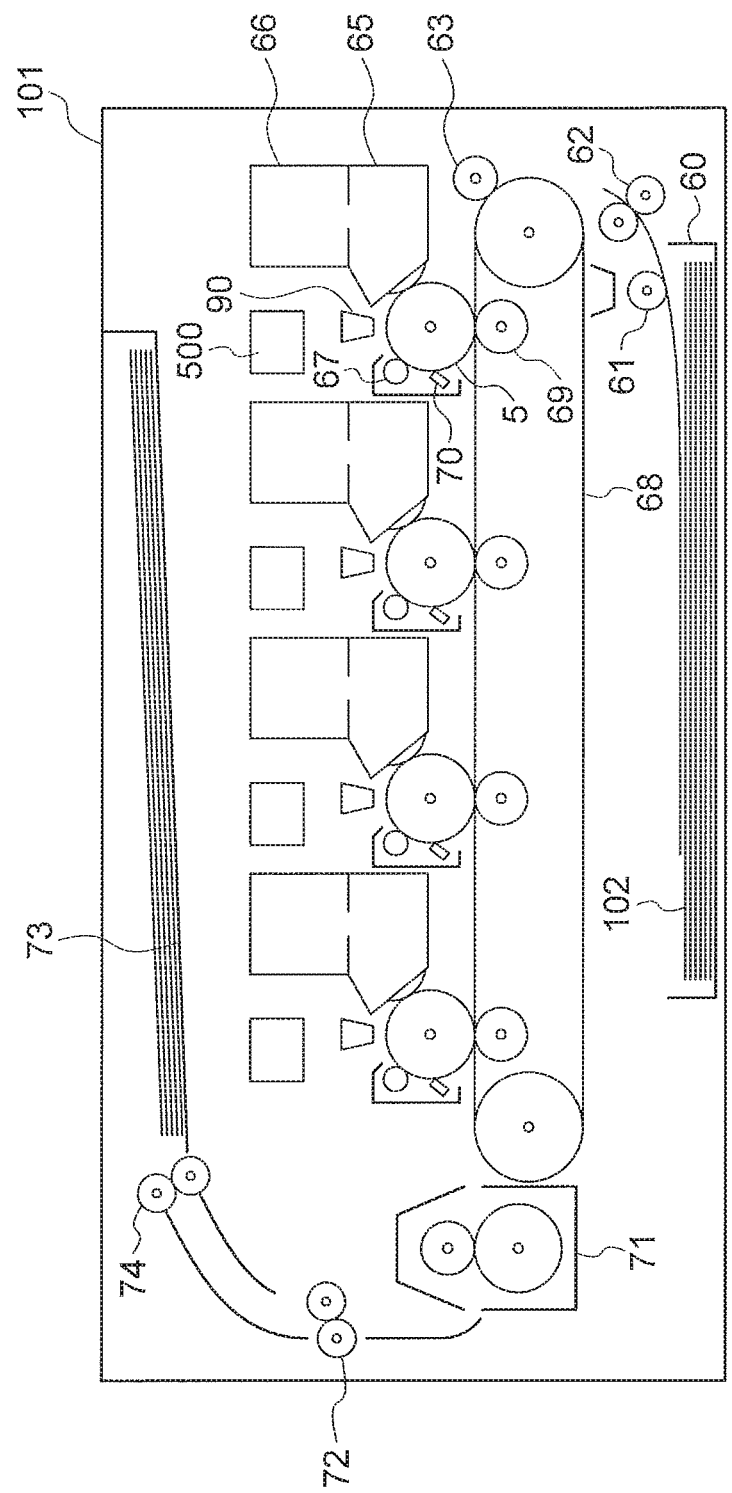
FIG. 22 is a view schematically illustrating a configuration of a printer according to a second embodiment of the present invention.

A configuration of a printer 101 as an image forming apparatus according to a second embodiment will be described with reference to FIG. 22. FIG. 22 is a view schematically illustrating a configuration of the printer 101 according to the second embodiment. In the printer 101 according to the second embodiment, an air supply unit 500 serving as a cooling device is disposed. The air supply unit 500 takes air from outside the printer 101 and sends the air to the periphery of the LED head 90 so that the temperature of the LED head 90 and the periphery of the LED head 90 can be reduced.

2-2. Operation

In the second embodiment, a upper limit temperature $T_H$ of an operation of the printer 101 satisfies Equation (7) so that a displacement amount between LED devices 2 and a lens array is within 25% of a pitch $P_X$. Equation (1) described in the first embodiment is modified for the upper limit temperature $T_H$, thereby obtaining Equation (6):

$$T_H = (2 \cdot D_X/(E_X \cdot W_E)) + T_S \quad (6)$$

From Equation (6), a upper limit temperature $T_H$ at which the displacement amount $D_X$ is 25% or less of the pitch $P_X$ of the lenses is obtained from Equation (7):

$$T_H \leq (0.5 \cdot P_X/(E_X \cdot W_E)) + T_S \quad (7)$$

In the printer 101 according to the second embodiment, the air supply unit 500 is operated in such a manner that Equation (7) is satisfied.

2-3. Advantages

In the printer 101 according to the second embodiment, the upper limit of the temperature of the lens array is provided so that the displacement between the LED devices 2 and the lens array can be reduced to 25% or less of the pitch $P_X$ of the lenses, thereby suppressing occurrence of banding in a printed image.

Description of reference characters is as follows:
1: holder, 2: LED device, 3: circuit board, 4: LED array, 5: photosensitive drum, 5a: rotation axis, 6: sliding part, 7: adhesive, 8: sealing member, 9: base, 10: first lens array, 11: lens, 12, 13: lens surface, 20: light shield plate, 21: opening, 30: second lens array, 31: lens, 32, 33: lens surface, 40: mask, 41: opening, 50: lens unit, 60: paper cassette, 61: paper feed roller, 62, 63, 64: conveying roller, 65: developing unit, 66: toner cartridge, 67: charging roller, 68: transfer belt, 69: transfer roller, 70: cleaning blade, 71: fixing unit, 72: conveying roller, 73: ejection unit, 74: ejection roller, 90: LED head, 100, 101: printer, 102: paper sheet (print medium), 500: air supply unit, TH: upper limit temperature, TS: reference temperature, RA1, RA2, RA3, RA4: opening radius, LFM, LFS, L0, LT, LG, LI: surface distance (distance), MT: thickness of mask, ST: thickness of light shield plat, PX, P1, P2, P2, P4, P5, P6, P7, P8: pitch in X direction, PY: pitch in Y direction, DX: displacement, CL: center line, R1, R2, R3, R4: light beam, WE1: first length, WE2: second length, WE3: third width, and WE4: fourth width.

What is claimed is:

1. A lens unit, comprising:
   a first lens array including a plurality of first lens elements arranged in a first direction,
   wherein the first lens array satisfies $$D_1 \leq 0.25 \cdot P_1$$

where
   $P_1$ is a pitch in the first direction between optical axes of adjacent first lens elements of the plurality of first lens elements, and
   $D_1$ is a displacement amount that is an absolute value of a difference between a first length which is a length in the first direction from a center position of the first lens array to an end position of the first lens array at a first temperature and a second length which is a length in the first direction from the center position of the first lens array to the end position of the first lens array at a second temperature higher than the first temperature by 30° C.; wherein
   the pitch $P_1$ satisfies $$P_1 \geq E_X \cdot W_E (T_H - T_S)/0.5$$

where
   $E_X$ is a coefficient of linear expansion of the first lens array,
   $W_E$ is a length of the first lens array in the first direction,
   $T_S$ is the first temperature, and
   $T_H$ is the second temperature.

2. The lens unit of claim 1, wherein:
   the first temperature is 25° C., and
   the second temperature is 55° C.

3. The lens unit of claim 1, wherein the pitch $P_1$ is 1.14 mm or more.

4. The lens unit of claim 1, wherein the plurality of first lens elements are arranged in a staggered pattern.

5. The lens unit of claim 1, wherein the plurality of first lens elements are linearly arranged.

6. The lens unit of claim 1, further comprising:
a first light shield member having a plurality of openings corresponding to the plurality of first lens elements respectively.

7. The lens unit of claim 1, further comprising:
a second lens array including a plurality of second lens elements arranged in a same way as the plurality of first lens elements, wherein
the second lens array satisfies $$D_2 \leq 0.25 \cdot P_2$$

where
$P_2$ is a pitch in the first direction between optical axes of adjacent second lens elements of the plurality of second lens elements, and
$D_2$ is a displacement amount that is an absolute value of a difference between a third length which is a length in the first direction from a center position of the second lens array to an end position of the second lens array at the first temperature and a fourth length which is a length in the first direction from the center position of the second lens array to the end position of the second lens array at the second temperature.

8. The lens unit of claim 7, further comprising:
a second light shield member having a plurality of second openings corresponding to the plurality of second lens elements respectively.

9. A light-exposure apparatus comprising:
a light-emitting device array including a plurality of light-emitting devices; and
the lens unit of claim 1 that converges light emitted from the light-emitting device array.

10. An image forming apparatus comprising:
the light-exposure apparatus of claim 9; and
an image carrier which is exposed to light by the light-exposure apparatus so that an electrostatic latent image is formed on the image carrier.

* * * * *